United States Patent
Na et al.

(10) Patent No.: US 9,591,307 B2
(45) Date of Patent: Mar. 7, 2017

(54) METHOD AND APPARATUS FOR DETERMINING INTRA PREDICTION MODE

(71) Applicant: SAMSUNG ELECTRONICS CO., LTD., Suwon-si (KR)

(72) Inventors: Sang-kwon Na, Seoul (KR); Ki-won Yoo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 244 days.

(21) Appl. No.: 14/464,942

(22) Filed: Aug. 21, 2014

(65) Prior Publication Data

US 2015/0055698 A1    Feb. 26, 2015

(30) Foreign Application Priority Data

Aug. 21, 2013 (KR) .................. 10-2013-0099247

(51) Int. Cl.
| | |
|---|---|
| *H04N 19/11* | (2014.01) |
| *H04N 19/119* | (2014.01) |
| *H04N 19/172* | (2014.01) |
| *H04N 19/96* | (2014.01) |
| *H04N 19/14* | (2014.01) |

(52) U.S. Cl.
CPC ........... *H04N 19/11* (2014.11); *H04N 19/119* (2014.11); *H04N 19/14* (2014.11); *H04N 19/172* (2014.11); *H04N 19/96* (2014.11)

(58) Field of Classification Search
CPC ....... H04N 19/11; H04N 19/119; H04N 19/14
See application file for complete search history.

(56) References Cited

U.S. PATENT DOCUMENTS

| | | | | |
|---|---|---|---|---|
| 7,715,652 | B1 * | 5/2010 | Zhang | .................. G06T 7/0081 382/224 |
| 2007/0036215 | A1 * | 2/2007 | Pan | ...................... H04N 19/176 375/240.12 |
| 2009/0245667 | A1 * | 10/2009 | Nagori | ................. G06K 9/6282 382/238 |
| 2010/0208802 | A1 * | 8/2010 | Tsukuba | ............... H04N 19/159 375/240.12 |
| 2011/0292998 | A1 * | 12/2011 | Ohgose | ................ H04N 19/176 375/240.08 |

* cited by examiner

*Primary Examiner* — Neil Mikeska
(74) *Attorney, Agent, or Firm* — Sughrue Mion, PLLC

(57) ABSTRACT

Provided are a method and an apparatus for determining an intra prediction mode. The method includes: splitting a maximum coding unit into coding units of a first size; acquiring an edge direction of each of the coding units of the first size; grouping adjacent coding units of the first size based on uniformity of edge directions of the adjacent coding units of the first size; determining a size range of coding units to be applied to intra prediction on the intra prediction coding unit group; performing the intra prediction on the intra prediction coding unit group by using coding units having sizes included in the determined size range; and determining a coding unit for the intra prediction and an intra prediction mode of the coding unit by comparing costs according to the performed intra prediction on the coding units having the sizes included in the size range.

10 Claims, 19 Drawing Sheets

FIG. 7
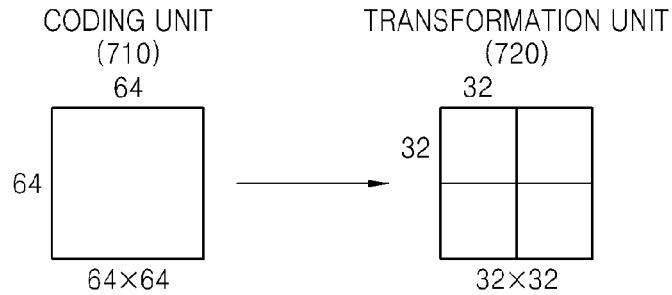
FIG. 8
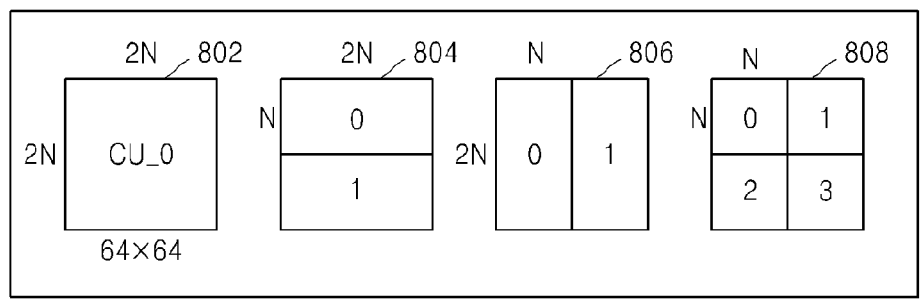
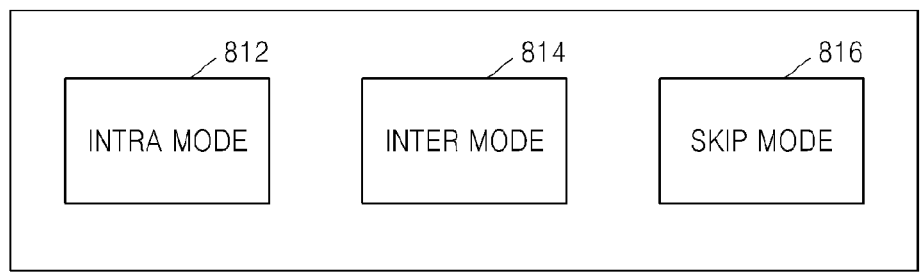
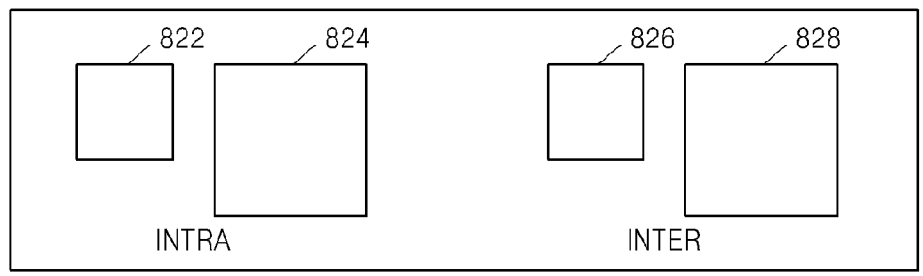

CODING UNIT (1010)

METHOD AND APPARATUS FOR DETERMINING INTRA PREDICTION MODE

CROSS-REFERENCE TO RELATED APPLICATION

This application claims priority from Korean Patent Application No. 10-2013-0099247, filed on Aug. 21, 2013 in the Korean Intellectual Property Office, the disclosure of which is incorporated herein in its entirety by reference.

BACKGROUND

1. Field

Apparatuses and methods consistent with exemplary embodiments relate to image encoding and decoding, and more particularly, to the efficient determination of sizes of coding units to be used to determine an intra prediction mode.

2. Description of the Related Art

In image compression schemes, such as moving picture expert group (MPEG)-1, MPEG-2, MPEG-4, and H.264/MPEG-4 advanced video coding (AVC), one picture is split into macroblocks to encode an image. Thereafter, each of the macroblocks is encoded in plural encoding modes usable in inter prediction and intra prediction, and is encoded by selecting one encoding mode according to a bit rate used to encode the macroblock and to a degree of distortion between the original macroblock and a decoded macroblock.

The development and distribution of hardware capable of playing and storing high-resolution or high-image quality video content has caused an increase in the demand for a video codec that effectively encodes or decodes the high-resolution or high-image quality video content. According to the related art video codec, a video is encoded in limited prediction modes based on macroblocks having predetermined sizes.

SUMMARY

Aspects of one or more exemplary embodiments provide a fast operation of determining an intra prediction mode by efficiently determining the size of a coding unit for intra prediction on the basis of an edge component included in a maximum coding unit.

Additional aspects will be set forth in part in the description which follows and, in part, will be apparent from the description, or may be learned by practice of exemplary embodiments.

According to an aspect of an exemplary embodiment, there is provided a method of determining an intra prediction mode, the method including: splitting a maximum coding unit into coding units of a first size; acquiring an edge direction of each of the coding units of the first size; grouping adjacent coding units of the first size, from among the coding units of the first size, into an intra prediction coding unit group, based on uniformity of edge directions of the adjacent coding units of the first size; determining a size range of coding units to be applied to intra prediction on the intra prediction coding unit group; performing the intra prediction on the intra prediction coding unit group by using coding units having sizes included in the determined size range; and determining a coding unit for the intra prediction and an intra prediction mode of the determined coding unit by comparing costs according to the performed intra prediction on the coding units having the sizes included in the size range.

According to an aspect of an exemplary embodiment, there is provided an apparatus for determining an intra prediction mode, the apparatus including: an edge detector configured to split a maximum coding unit into coding units of a first size and to acquire an edge direction of each of the coding units of the first size; an intra prediction mode candidate determiner configured to determine adjacent coding units of the first size, from among the coding units of the first size, into an intra prediction coding unit group, based on uniformity of edge directions of the adjacent coding units of the first size, and to determine a size range of coding units to be applied to intra prediction on the intra prediction coding unit group; and an intra prediction mode determiner configured to perform the intra prediction on the intra prediction coding unit group by using coding units having sizes included in the determined size range, and to determine a coding unit for the intra prediction and an intra prediction mode of the coding unit by comparing costs according to the performed intra prediction on the coding units having the sizes included in the size range.

BRIEF DESCRIPTION OF THE DRAWINGS

These and/or other aspects will become apparent and more readily appreciated from the following description of exemplary embodiments, taken in conjunction with the accompanying drawings in which:

FIG. 7 illustrates a relationship between a coding unit and a transformation unit, according to an exemplary embodiment;

FIG. 8 illustrates encoding information per depth, according to an exemplary embodiment;

DETAILED DESCRIPTION OF EXEMPLARY EMBODIMENTS

Figure 1:
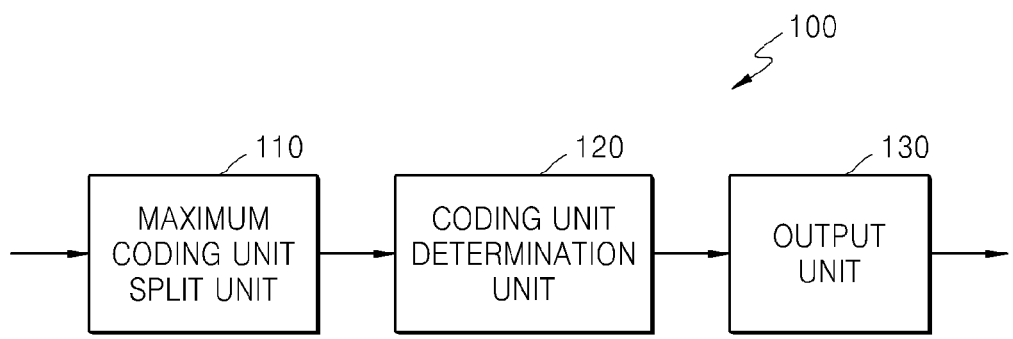
FIG. 1 is a block diagram of a video encoding apparatus according to an exemplary embodiment.

Reference will now be made in detail to exemplary embodiments, examples of which are illustrated in the accompanying drawings, wherein like reference numerals refer to like elements throughout. In this regard, exemplary embodiments may have different forms and should not be construed as being limited to the descriptions set forth herein. Accordingly, exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram of a video encoding apparatus 100 according to an exemplary embodiment.

The video encoding apparatus 100 according to an exemplary embodiment includes a maximum coding unit split unit 110 (e.g., maximum coding unit splitter), a coding unit determination unit 120 (e.g., coding unit determiner), and an output unit 130 (e.g., outputter).

The maximum coding unit split unit 110 may partition a current picture of an image based on a maximum coding unit that is a coding unit of a maximum size in the current picture. When the current picture is greater than the maximum coding unit, image data of the current picture may be split into at least one maximum coding unit. The maximum coding unit according to an exemplary embodiment may be a data unit of a regular quadrilateral of which each of horizontal and vertical lengths is a power of 2 that is greater than 8, such as a data unit having a size of 32×32, 64×64, 128×128, 256×256, or the like. The image data may be output to the coding unit determination unit 120, based on the at least one maximum coding unit.

A coding unit according to an exemplary embodiment may be specified by a maximum size and a depth. A depth indicates the number of spatial splits of a coding unit starting from the maximum coding unit, and as the depth deepens, a coding unit per depth may be split from the maximum coding unit up to a minimum coding unit. The depth of the maximum coding unit may be defined as a maximum depth, and the minimum coding unit may be defined as the lowest coding unit. Since a size of a coding unit per depth decreases from the maximum coding unit as the depth deepens, a coding unit of a high depth may include a plurality of coding units of a low depth.

As described above, the image data of the current picture may be split into maximum coding units based on a maximum size of coding units, and each of the maximum coding units may include coding units split per depth. Since the maximum coding unit according to an exemplary embodiment is split per depth, image data of a spatial domain, which is included in the maximum coding unit, may be hierarchically classified according to depths.

A maximum depth for limiting the total number of hierarchical splits of a height and a width of the maximum coding unit and a maximum size of coding units may be set in advance.

The coding unit determination unit 120 encodes at least one split region obtained by splitting a region of the maximum coding unit for each depth and determines a depth for outputting a final encoding result based on the at least one split region. That is, the coding unit determination unit 120 encodes the image data in coding units per depth for each maximum coding unit of the current picture, selects a depth in which the smallest encoding error occurs, and determines the selected depth as a coded depth. The determined coded depth and the image data for each maximum coding unit are output to the output unit 130.

The image data in each maximum coding unit is encoded based on coding units per depth according to at least one depth that is the maximum depth or less, and an encoding result based on coding units per depth is compared with one other. As a result of comparing encoding errors of coding units per depth, a depth in which the smallest encoding error occurs may be selected. At least one coded depth for each maximum coding unit may be determined.

The size of each maximum coding unit is split by hierarchically splitting a corresponding coding unit as a depth deepens, and the number of coding units increases. In addition, even for coding units in a same depth, which are included in one maximum coding unit, an encoding error for data of each of the coding units is measured, and it is determined whether each of the coding units is split to a lower depth than the same depth. Therefore, even though data is included in one maximum coding unit, the data has a different encoding error per depth according to a location thereof, and thus, a coded depth per location may be differently determined. Therefore, one or more coded depths may be set for one maximum coding unit, and data of the maximum coding unit may be partitioned according to coding units of the one or more coded depths.

Therefore, the coding unit determination unit 120 according to an exemplary embodiment may determine coding units according to a tree structure, which are included in a current maximum coding unit. The "coding units according to a tree structure" according to an exemplary embodiment include coding units of a depth determined as the coded depth from among coding units of all depths, which are included in the current maximum coding unit. The coding units of the coded depth may be hierarchically determined according to depths in a same region and independently determined in the other regions, within a maximum coding unit. Likewise, a coded depth for a current region may be independently determined to coded depths for the other regions.

The maximum depth according to an exemplary embodiment is an index related to the number of splits from the maximum coding unit up to the minimum coding unit. A first maximum depth according to an exemplary embodiment may indicate the total number of splits from the maximum coding unit up to the minimum coding unit. A second maximum depth according to an exemplary embodiment may indicate the total number of depth levels from the maximum coding unit up to the minimum coding unit. For example, when the depth of the maximum coding unit is 0, a depth of coding units obtained by splitting the maximum coding unit once may be set to 1, and a depth of coding units obtained by splitting the maximum coding unit twice may be set to 2. In this case, if coding units obtained by splitting the maximum coding unit four times are minimum coding units, depth levels of 0, 1, 2, 3, and 4 exist, and thus, the first maximum depth may be set to 4, and the second maximum depth may be set to 5.

Prediction encoding and frequency transformation on maximum coding units may be performed. Likewise, the prediction encoding and the frequency transformation are also performed based on coding units per depth for each depth that is the maximum depth or less for each maximum coding unit.

Every time a maximum coding unit is split for each depth, the number of coding units per depth increases, and thus, encoding including the prediction encoding and the frequency transformation may be performed on coding units of all depths, which are generated along with an increase in a depth. Hereinafter, for convenience of description, the prediction encoding and the frequency transformation will be described based on coding units of a current depth within at least one maximum coding unit.

The video encoding apparatus 100 according to an exemplary embodiment may select various sizes and shapes of data units for encoding image data. To encode the image data, operations, such as prediction encoding, frequency transformation, entropy encoding, and the like, are undergone, wherein a same data unit may be used all over the operations, or a data unit may be changed for each operation.

For example, the video encoding apparatus 100 may select not only a coding unit for encoding image data but also a data unit that is different from the coding unit to perform prediction encoding on the image data in the coding unit.

For prediction encoding in a maximum coding unit, the prediction encoding may be performed based on a coding unit of the coded depth according to an exemplary embodiment, i.e., a coding unit that is not split any more. Hereinafter, the coding unit that is not split any more, which is a basis of prediction encoding, is referred to as "a prediction unit". Each partition obtained by splitting the prediction unit may include the prediction unit or a data unit obtained by at least one of a height and a width of the prediction unit is split.

For example, when a coding unit having a size of 2N×2N (N is a positive integer) is not split any more, the prediction unit has the size of 2N×2N, and a size of a partition may be 2N×2N, 2N×N, N×2N, N×N, or the like. Partition types according to an exemplary embodiment may selectively include symmetrical partitions obtained by symmetrically splitting the height or the width of the prediction unit, partitions obtained by asymmetrically splitting the height or the width of the prediction unit in 1:n or n:1, partitions split in geometric shapes, partitions split in random shapes, and the like.

A prediction mode of the prediction unit may be at least one selected from the group consisting of an intra mode, an inter mode, and a skip mode. For example, the intra mode and the inter mode may be performed for partitions having sizes of 2N×2N, 2N×N, N×2N, and N×N. The skip mode may be performed only for partitions having the size of 2N×2N. Encoding may be independently performed on each prediction unit within a coding unit to select a prediction mode in which the smallest encoding error occurs.

In addition, the video encoding apparatus 100 according to an exemplary embodiment may perform frequency transformation on image data in coding units based on not only a coding unit for encoding the image data but also a data unit that is different from the coding unit.

For frequency transformation in a coding unit, the frequency transformation may be performed based on a data unit that is less than or equal to the coding unit. For example, the data unit for the frequency transformation may include a data unit for the intra mode and a data unit for the inter mode.

Hereinafter, the data unit, which is a basis of the frequency transformation, may be referred to as "a transformation unit". In a similar method to the coding unit, a transformation unit within a coding unit may also be recursively split into transformation units having smaller sizes to thereby partition residual data based on transformation units according to a tree structure along with transformation depths.

For a transformation unit according to an exemplary embodiment, a transformation depth indicating the number of splits up to the transformation unit by splitting a height and a width of a coding unit may also be set. For example, if a transformation unit of a current coding unit having a size of 2N×2N has the size of 2N×2N, the transformation depth may be set to 0, if the transformation unit has a size of N×N, the transformation depth may be set to 1, and if the transformation unit has a size of N/2×N/2, the transformation depth may be set to 2. That is, for the transformation unit, transformation units according to a tree structure may also be set based on the transformation depth.

Encoding information per coded depth demands not only a coded depth but also prediction-related information and frequency transformation-related information. Therefore, the coding unit determination unit 120 may determine a coded depth in which a minimum encoding error occurs, a partition type in which a prediction unit is split into partitions, a prediction mode for each prediction unit, a size of a transformation unit for frequency transformation, and the like.

A method of determining coding units according to a tree structure and partitions for a maximum coding unit will be described below in detail with reference to FIGS. 3 to 12.

The coding unit determination unit 120 may measure encoding errors of coding units per depth by using Lagrangian multiplier based rate-distortion optimization.

The output unit 130 outputs the image data in maximum coding units, which has been encoded based on the at least one coded depth determined by the coding unit determination unit 120, and information about encoding modes per depth in a bitstream format.

The encoded image data may be an encoding result of residual data of an image.

The information about encoding modes per depth may include coded depth information, partition type information of a prediction unit, prediction mode information, size information of a transformation unit, and the like.

The coded depth information may be defined using per-depth split information indicating whether encoding is performed in coding units of a lower depth without encoding in a current depth. When a current depth of a current coding unit is a coded depth, the current coding unit is encoded in a coding unit of the current depth, and thus split information of the current depth may be defined so as not to be split to a lower depth any more. On the contrary, when the current depth of the current coding unit is not a coded depth, encoding using a coding unit of the lower depth may be performed, and thus, the split information of the current depth may be defined so as to be split into coding units of the lower depth.

When the current depth is not a coded depth, encoding on the coding units split to the lower depth is performed. Since one or more coding units of the lower depth exist within the coding unit of the current depth, encoding may be repeatedly performed on each of the coding units of the lower depth, thereby performing recursive encoding on every coding units of a same depth.

Since coding units of a tree structure may be determined within one maximum coding unit and information on at least one encoding mode may be determined for each coding unit of a coded depth, information on at least one encoding mode may be determined for the one maximum coding unit. In addition, since data of a maximum coding unit may have a different coded depth for each location by being hierarchically partitioned according to depths, information on coded depths and encoding modes may be set for the data.

Therefore, the output unit 130 according to an exemplary embodiment may allocate encoding information on a corresponding coded depth and a corresponding encoding mode to at least one selected from the group consisting of coding units, prediction units, and minimum units included in a maximum coding unit.

A minimum unit according to an exemplary embodiment may be a data unit of a regular quadrilateral having a size obtained by equally splitting a minimum coding unit of the lowest coded depth by four and may be a data unit of a regular quadrilateral having a maximum size, which is possibly included in each of all of coding units, prediction units, and transformation units included in a maximum coding unit.

For example, encoding information output from the output unit 130 may be classified into encoding information for each coding unit per depth and encoding information for each prediction unit. The encoding information for each coding unit per depth may include prediction mode information and partition size information. Encoding information transmitted for each prediction unit may include information on an estimated direction of the inter mode, information on a reference image index of the inter mode, information on a motion vector, information on a chroma component of the intra mode, information on an interpolation method of the intra mode, and the like. In addition, information on a maximum size of coding units defined for each picture, slice, or group of pictures (GOP) and information on a maximum depth may be inserted into a header of a bitstream.

According to an exemplary embodiment of the video encoding apparatus 100, a coding unit per depth is a coding unit having a size obtained by equally splitting a height and a width of a coding unit of a one-layer higher depth by two. That is, when a size of a coding unit of a current depth is 2N×2N, a size of a coding unit of a lower depth is N×N. In addition, a current coding unit having the size of 2N×2N may include maximum four lower-depth coding units having the size of N×N.

Therefore, the video encoding apparatus 100 according to an exemplary embodiment may configure coding units according to a tree structure by determining coding units of optimal shapes and sizes for each maximum coding unit based on sizes and maximum depths determined in consideration of the characteristics of a current picture. In addition, encoding may be performed in various prediction modes, frequency transformation schemes, and the like for each maximum coding unit, and thus, optimal encoding modes may be determined in consideration of image characteristics of coding units having various image sizes.

Therefore, when an image having a very high image resolution or a very large data volume is encoded in related art macroblock units, the number of macroblocks per picture is excessively large. Accordingly, compression information generated for each macroblock is also large, and thus, a transmission load of the compression information tends to be large, and data compression efficiency tends to decrease. Therefore, the video encoding apparatus 100 according to an exemplary embodiment may increase a maximum size of coding units in consideration of a size of an image and adjust the coding units in consideration of characteristics of the image, and thus, image compression efficiency may increase.

Figure 2:
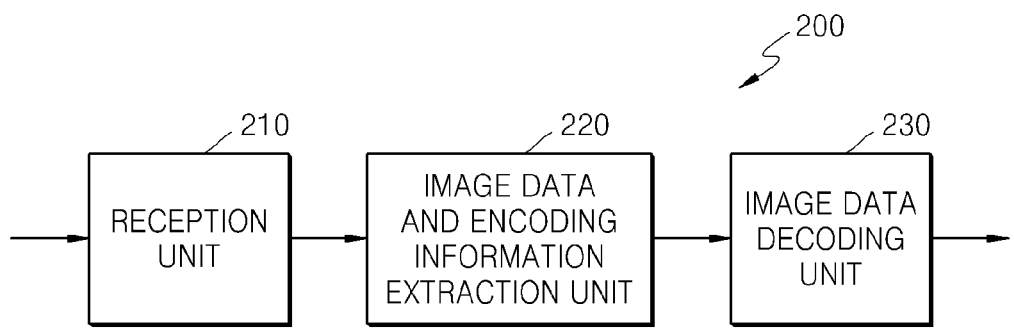
FIG. 2 is a block diagram of a video decoding apparatus according to an exemplary embodiment.

FIG. 2 is a block diagram of a video decoding apparatus 200 according to an exemplary embodiment.

The video decoding apparatus 200 according to an exemplary embodiment includes a reception unit 210 (e.g., receiver), an image data and encoding information extraction unit 220 (e.g., image data and encoding information extractor), and an image data decoding unit 230 (e.g., image data decoder). The definition of various terms, such as a coding unit, a depth, a prediction unit, a transformation unit, information on various encoding modes, and the like, for various kinds of processing of the video decoding apparatus 200 according to an exemplary embodiment is the same as or similar to described above with reference to FIG. 1 and the video encoding apparatus 100.

The reception unit 210 receives and parses a bitstream of an encoded video. The image data and encoding information extraction unit 220 extracts encoded image data for each coding unit based on coding units according to a tree structure for each maximum coding unit from the parsed bitstream and outputs the extracted encoded image data to the image data decoding unit 230. The image data and encoding information extraction unit 220 may extract information on a maximum size of coding units of a current picture from a header for the current picture.

In addition, the image data and encoding information extraction unit 220 extracts information on coded depths and encoding modes of coding units according to a tree structure for each maximum coding unit from the parsed bitstream. The extracted information on the coded depths and the encoding modes is output to the image data decoding unit 230. That is, the image data of the bitstream may be split into maximum coding units so that the image data decoding unit 230 decodes the image data for each maximum coding unit.

The information on the coded depths and the encoding modes for each maximum coding unit may be set for one or more pieces of coded depth information, and information on an encoding mode per coded depth may include partition type information, prediction mode information, transformation unit size information, and the like of a corresponding coding unit. In addition, per-depth split information may be extracted as the coded depth information.

The information on the coded depths and the encoding modes for each maximum coding unit, which is extracted by the image data and encoding information extraction unit 220, is information on coded depths and encoding modes in which it is determined that a minimum encoding error occurs by repeatedly encoding each per-depth coding unit for each maximum coding unit in an encoding end, such as the video encoding apparatus 100 according to an exemplary embodiment. Therefore, the video decoding apparatus 200 may restore an image by decoding data according to encoding schemes in which the minimum encoding error has occurred.

Encoding information on a coded depth and an encoding mode according to an exemplary embodiment may be allocated to a predetermined data unit from among a corresponding coding unit, prediction unit, and minimum unit, and thus the image data and encoding information extraction unit 220 may extract information on a coded depth and an encoding mode for each predetermined data unit. If information on coded depths and encoding modes of a corresponding maximum coding unit is recorded for each predetermined data unit, predetermined data units having information on a same coded depth and a same encoding mode may be inferred as data units included in a same maximum coding unit.

The image data decoding unit 230 restores a current picture by decoding image data of each maximum coding unit based on the information on the coded depths and the encoding modes for each maximum coding unit. That is, the image data decoding unit 230 may decode encoded image data based on a read partition type, prediction mode, and transformation unit for each coding unit from among coding units according to a tree structure, which are included in a maximum coding unit. A decoding operation may include a prediction operation, which includes intra prediction and motion compensation, and an inverse frequency transformation operation.

The image data decoding unit 230 may perform intra prediction or motion compensation according to each partition and prediction mode for each coding unit based on partition type information and prediction mode information of a prediction unit of a coding unit per coded depth.

In addition, the image data decoding unit 230 may perform inverse frequency transformation according to each transformation unit for each coding unit based on transformation unit size information of a coding unit per coded depth.

The image data decoding unit 230 may determine a coded depth of a current maximum coding unit by using per-depth split information. If split information indicates that splitting is not performed any more at a current depth, a current depth is the coded depth. Therefore, the image data decoding unit 230 may decode a coding unit of the current depth by using partition type, prediction mode, and transformation unit size information of a prediction unit for image data of a current maximum coding unit.

That is, by observing encoding information set for a predetermined data unit from among a coding unit, a prediction unit, and a minimum unit, data units having encoding information including same split information may be gathered and considered as one data unit to be decoded in a same encoding mode by the image data decoding unit 230.

The video decoding apparatus 200 according to an exemplary embodiment may acquire information on a coding unit in which a minimum encoding error occurs by recursively encoding each maximum coding unit in an encoding operation and use the acquired information for encoding a current picture. That is, encoded image data of coding units according to a tree structure, which are determined as optimal coding units for each maximum coding unit may be decoded.

Therefore, even for an image having a high resolution or an excessive data volume, image data may be efficiently decoded and restored according to sizes and encoding modes of coding units adaptively determined according to characteristics of the image by using information on optimal encoding modes, which is transmitted from an encoding end.

A method of determining coding units, prediction units and transformation units according to a tree structure, according to an exemplary embodiment, will now be described with reference to FIGS. 3 to 13.

Figure 3:
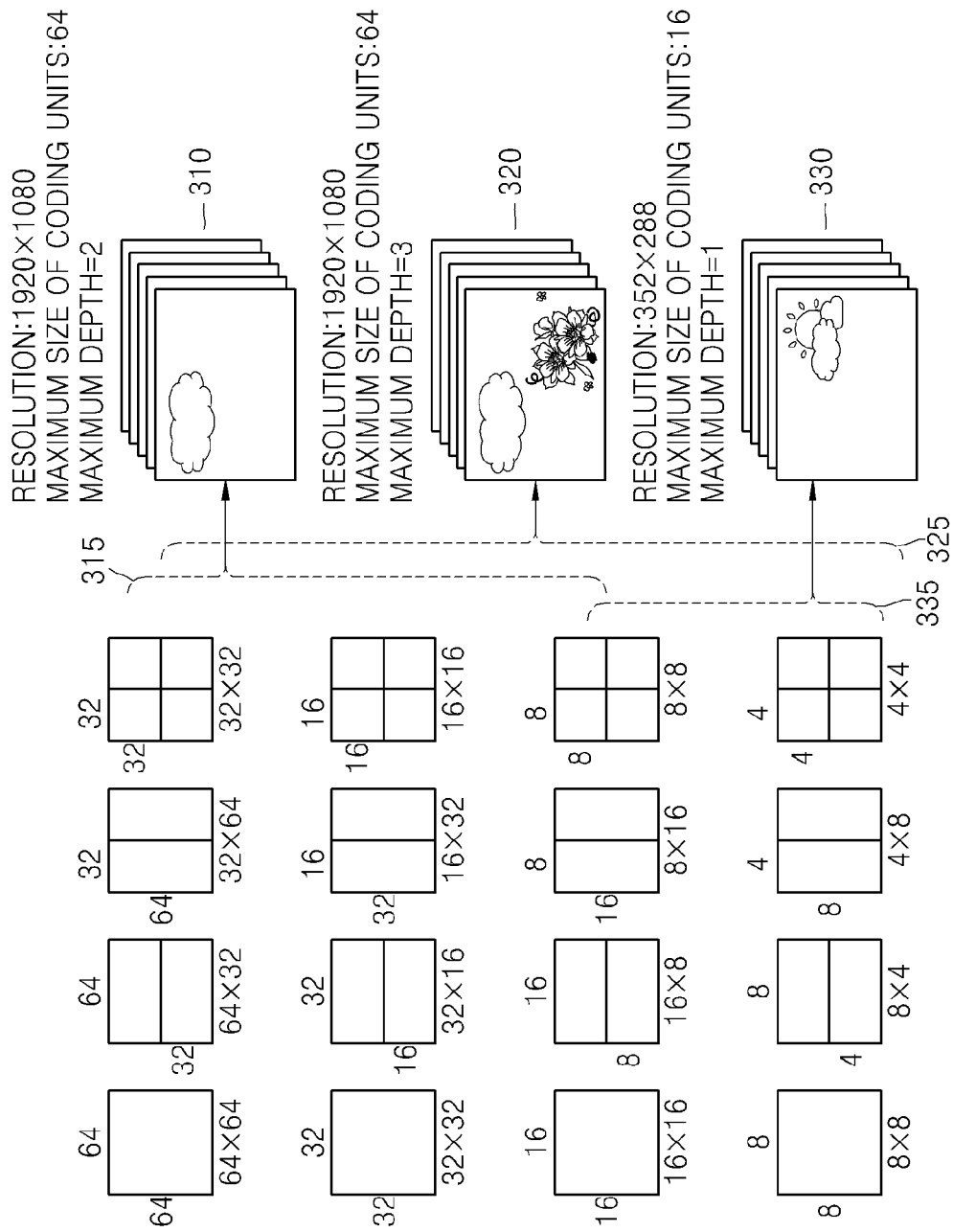
FIG. 3 is a conceptual diagram of coding units according to an exemplary embodiment.

FIG. 3 is a conceptual diagram of hierarchical coding units.

As an example of coding units, a size of a coding unit is represented as width×height, and the coding units may have sizes of 64×64, 32×32, 16×16, and 8×8. A coding unit having the size of 64×64 may be split into partitions having sizes of 64×64, 64×32, 32×64, and 32×32, a coding unit having the size of 32×32 may be split into partitions having sizes of 32×32, 32×16, 16×32, and 16×16, a coding unit having the size of 16×16 may be split into partitions having sizes of 16×16, 16×8, 8×16, and 8×8, and a coding unit having the size of 8×8 may be split into partitions having sizes of 8×8, 8×4, 4×8, and 4×4.

Video data 310 is set such that a resolution is 1920×1080, a maximum size of coding units 315 is 64, and a maximum depth is 2. Video data 320 is set such that a resolution is 1920×1080, a maximum size of coding units 325 is 64, and a maximum depth is 3. Video data 330 is set such that a resolution is 352×288, a maximum size of coding units 335 is 16, and a maximum depth is 1. Each of the maximum depths illustrated in FIG. 3 indicates the total number of splits from a maximum coding unit up to a minimum coding unit.

When a resolution is high or a data volume is large, a maximum size of coding units may be relatively large to increase encoding efficiency and to correctly reflect image characteristics. Therefore, for the video data 310 and 320 having a higher resolution than the video data 330, the maximum size of coding units may be selected as 64.

Since the maximum depth of the video data 310 is 2, the coding units 315 of the video data 310 may include a maximum coding unit of which a size of a long axis is 64 and coding units of which a size of a long axis is 32 or 16 in a two-layer deeper depth according to two-time split. However, since the maximum depth of the video data 330 is 1, the coding units 335 of the video data 330 may include coding units of which a size of a long axis is 16 and coding units of which a size of a long axis is 8 in a one-layer deeper depth according to one-time split.

Since the maximum depth of the video data 320 is 3, the coding units 325 of the video data 320 may include the maximum coding unit of which a size of a long axis is 64 and coding units of which a size of a long axis is 32, 16, or 8 in a three-layer deeper depth according to three-time split. As a depth deepens, the representation ability of detailed information may increase.

Figure 4:
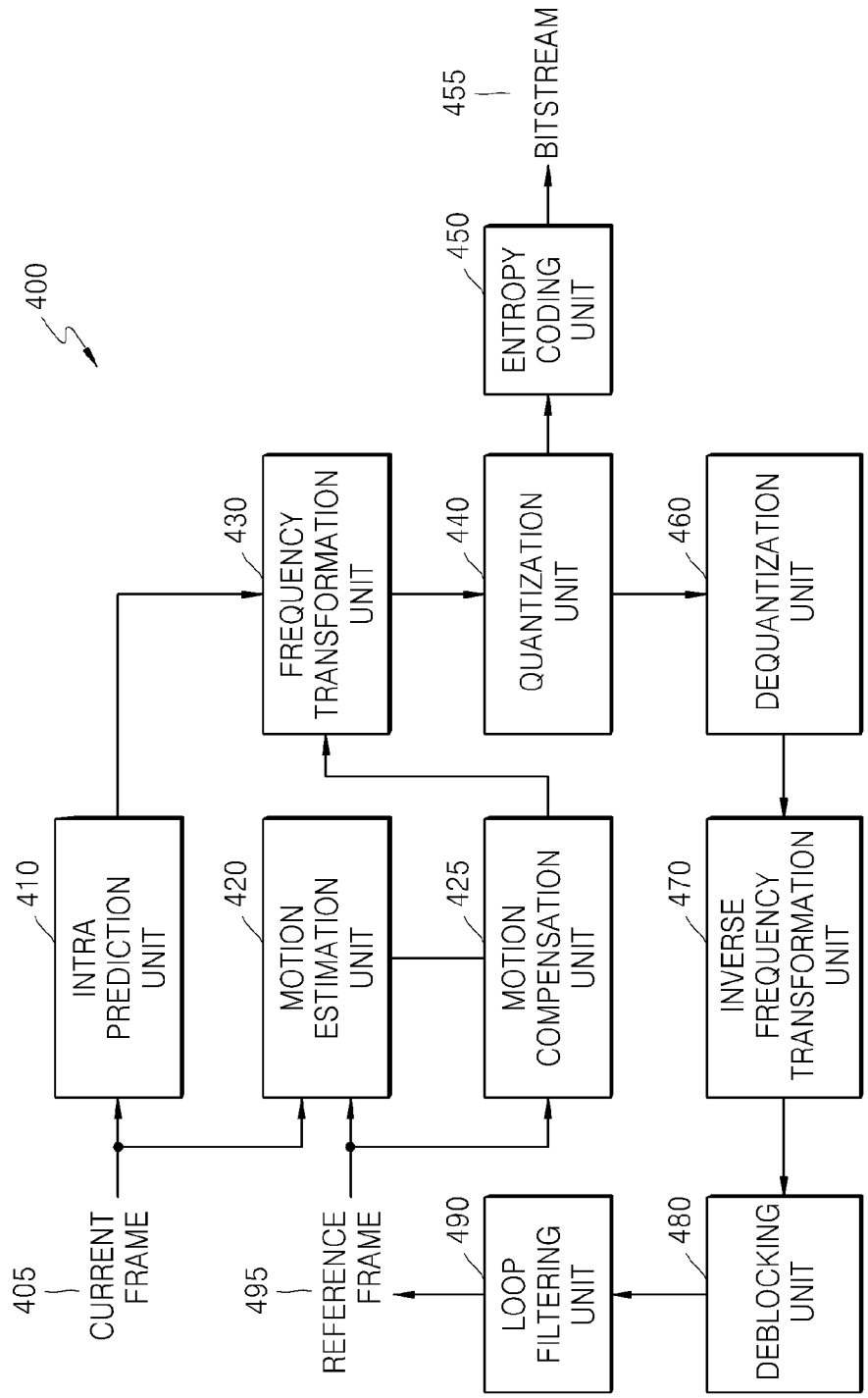
FIG. 4 is a block diagram of an image coding unit based on coding units, according to an exemplary embodiment.

FIG. 4 is a block diagram of an image coding unit 400 (e.g., image coder) based on coding units, according to an exemplary embodiment.

The image coding unit 400 according to an exemplary embodiment includes operations undergone to encode image data in the coding unit determination unit 120 of the video encoding apparatus 100. That is, an intra prediction unit 410 (e.g., intra predictor) performs intra prediction on coding units of the intra mode in a current frame 405, and a motion estimation unit 420 (e.g., motion estimator) and a motion compensation unit 425 (e.g., motion compensator) respectively perform inter estimation and motion compensation by using the current frame 405 and a reference frame 495 of the inter mode.

Data output from the intra prediction unit 410, the motion estimation unit 420, and the motion compensation unit 425 is output as quantized transformation coefficients by passing through a frequency transformation unit 430 (e.g., frequency transformer) and a quantization unit 440 (e.g., quantizer). The quantized transformation coefficients are restored as data of the spatial domain by passing through a dequantization unit 460 (e.g., dequantizer) and an inverse frequency transformation unit 470 (e.g., inverse frequency transformer), and the restored data of the spatial domain is post-processed by passing through a deblocking unit 480 (e.g., deblocker) and a loop filtering unit 490 (e.g., loop filterer) and is output as the reference frame 495. The quantized transformation coefficients may be output as a bitstream 455 by passing through an entropy coding unit 450 (e.g., entropy coder).

To apply the image coding unit 400 to the video encoding apparatus 100 according to an exemplary embodiment, all of the components of the image coding unit 400, i.e., the intra prediction unit 410, the motion estimation unit 420, the motion compensation unit 425, the frequency transformation unit 430, the quantization unit 440, the entropy coding unit 450, the dequantization unit 460, the inverse frequency transformation unit 470, the deblocking unit 480, and the loop filtering unit 490, may perform operations based on each of coding units according to a tree structure in consideration of a maximum depth for each maximum coding unit.

Particularly, the intra prediction unit 410, the motion estimation unit 420, and the motion compensation unit 425 may determine partitioning and a prediction mode of each of coding units according to a tree structure in consideration of a maximum size and a maximum depth of a current maximum coding unit, and the frequency transformation unit 430 may determine a size of a transformation unit within each of the coding units according to a tree structure.

Figure 5:
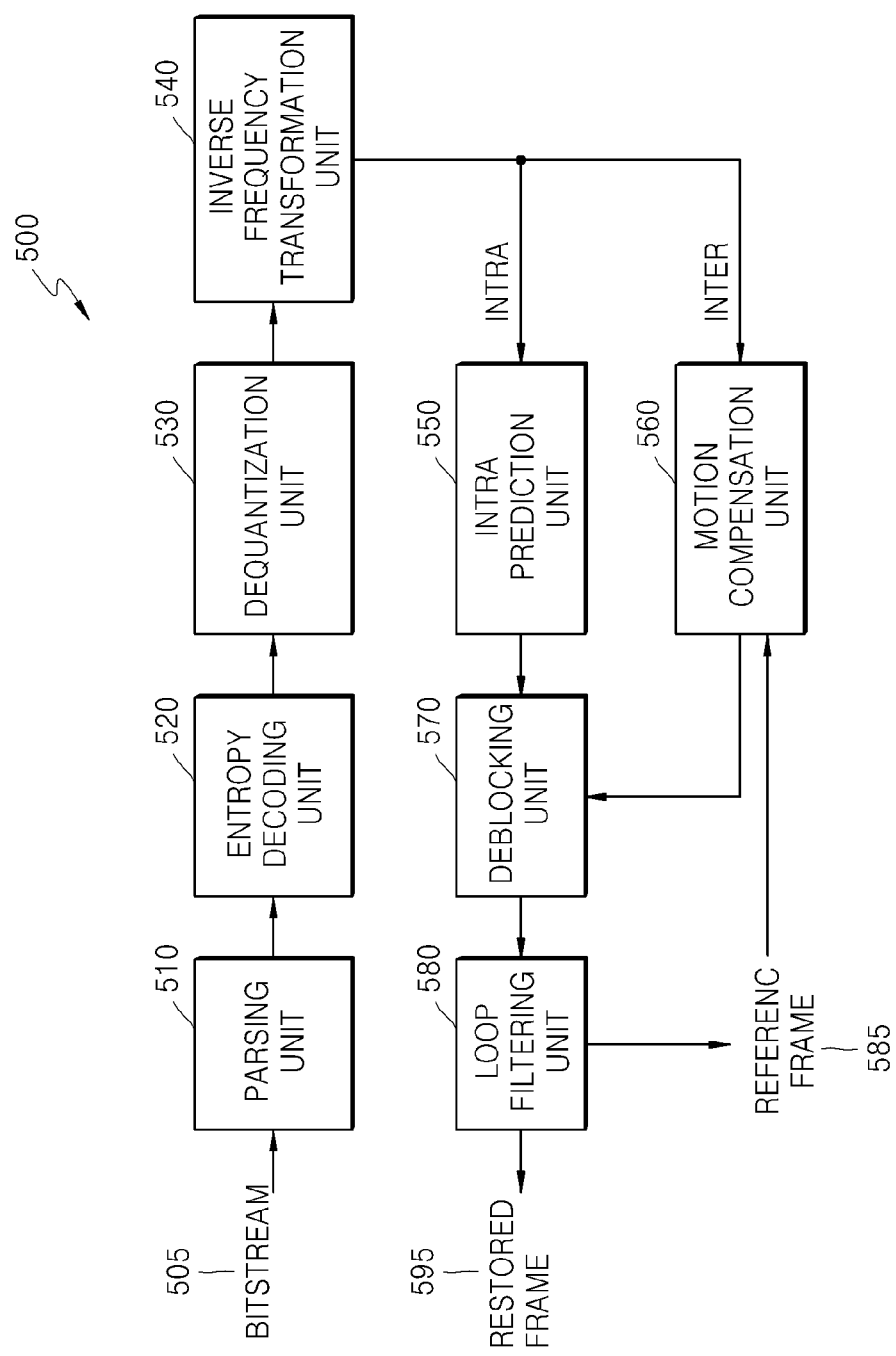
FIG. 5 is a block diagram of an image decoding unit based on coding units, according to an exemplary embodiment.

FIG. 5 is a block diagram of an image decoding unit 500 based on coding units, according to an exemplary embodiment.

A bitstream 505 passes through a parsing unit 510 (e.g., parser), thereby parsing encoded image data to be decoded and information on encoding that is necessary for the decoding. The encoded image data is output as dequantized data by passing through an entropy decoding unit 520 (e.g., entropy decoder) and a dequantization unit 530 (e.g., dequantizer), and image data of the spatial domain is restored by passing the dequantized data through an inverse frequency transformation unit 540 (e.g., inverse frequency transformer).

For the image data of the spatial domain, an intra prediction unit 550 (e.g., intra predictor) performs intra prediction on coding units of the intra mode, and a motion compensation unit 560 (e.g., motion compensator) performs motion compensation on coding units of the inter mode by using a reference frame 585 together with the coding units of the inter mode.

The image data of the spatial domain, which has passed through the intra prediction unit 550 and the motion compensation unit 560, is post-processed by passing through a deblocking unit 570 (e.g., deblocker) and a loop filtering unit 580 (e.g., loop filterer) and may be output as a restored frame 595. In addition, the data post-processed by passing through the deblocking unit 570 and the loop filtering unit 580 may be output as the reference frame 585.

To decode image data in the image data decoding unit 230 of the video decoding apparatus 200, sequential operations may be performed after the parsing unit 510 of the image decoding unit 500 according to an exemplary embodiment.

To apply the image decoding unit 500 to the video decoding apparatus 200 according to an exemplary embodiment, all the components of the image decoding unit 500, i.e., the parsing unit 510, the entropy decoding unit 520, the dequantization unit 530, the inverse frequency transformation unit 540, the intra prediction unit 550, the motion compensation unit 560, the deblocking unit 570, and the loop filtering unit 580, may perform operations based on coding units according to a tree structure for each maximum coding unit.

Particularly, the intra prediction unit 550 and the motion compensation unit 560 may determine partitioning and a prediction mode of each of the coding units according to a tree structure, and the inverse frequency transformation unit 540 may determine a size of a transformation unit for each coding unit.

Figure 6:
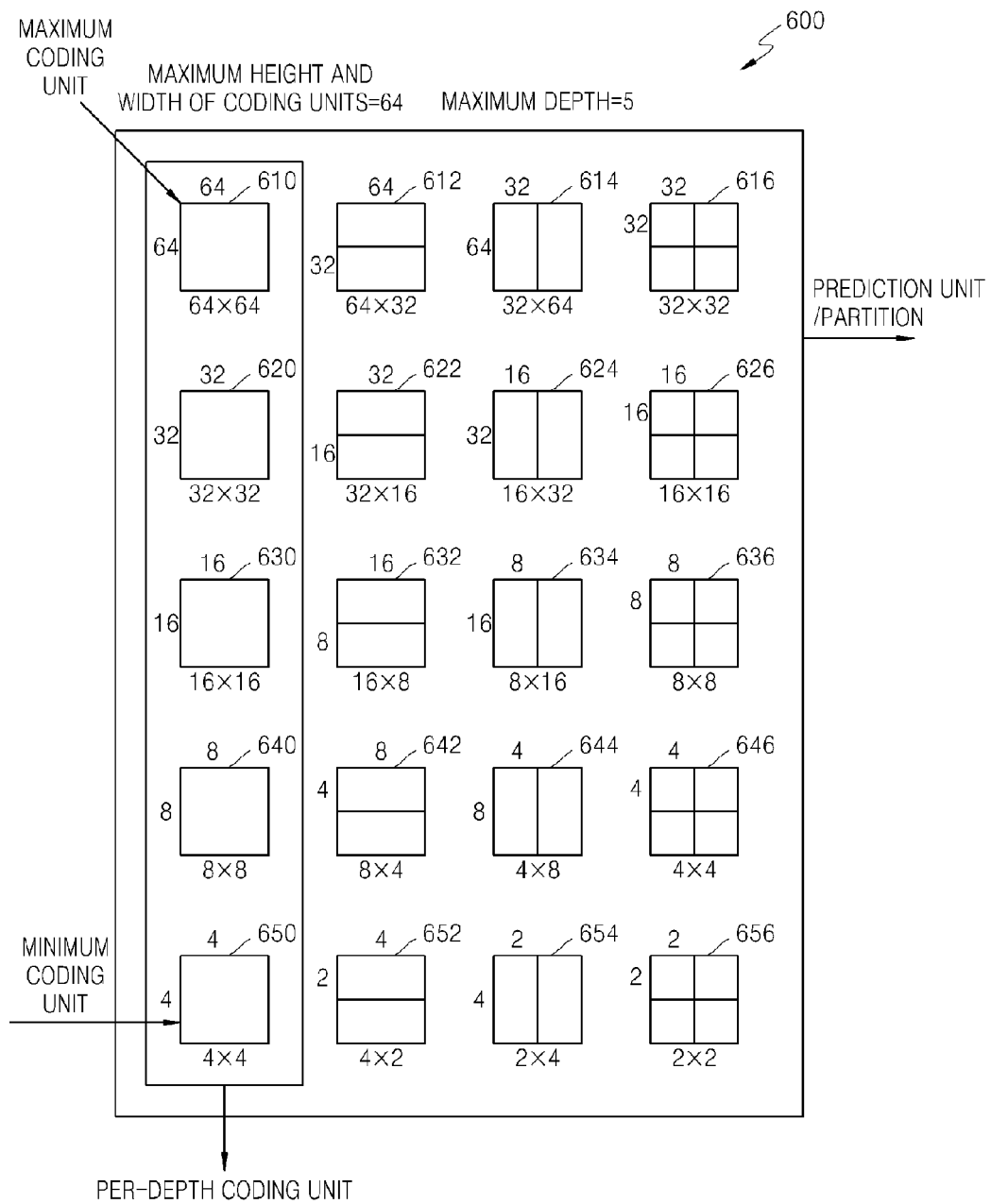
FIG. 6 illustrates coding units per depth and partitions, according to an exemplary embodiment.

FIG. 6 illustrates coding units and partitions per depth, according to an exemplary embodiment.

The video encoding apparatus 100 according to an exemplary embodiment and the video decoding apparatus 200 according to an exemplary embodiment use hierarchical coding units to consider image characteristics. A maximum height, a maximum width, and a maximum depth of the coding units may be adaptively determined according to characteristics of an image or may be variously determined in response to a request of a user. Sizes of coding units per depth may be determined according to a preset maximum size of the coding units.

A hierarchical structure 600 of coding units according to an exemplary embodiment illustrates that a maximum height and width of the coding units is 64, and a maximum depth is 4. Since a depth is getting deeper along a vertical axis of the hierarchical structure 600 of coding units according to an exemplary embodiment, each of heights and widths of coding units per depth is split. In addition, a prediction unit and partitions, which are a basis of prediction encoding of each coding unit per depth, are shown along a horizontal axis of the hierarchical structure 600 of coding units.

That is, a coding unit 610 is a maximum coding unit in the hierarchical structure 600 of coding units, of which a depth is 0, and a coding unit size, i.e., a height and a width, is 64×64. A depth is getting deeper along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and a depth of 4 is a minimum coding unit.

A prediction unit and partitions are arranged along the vertical axis for each depth. That is, when the coding unit 610 having the size of 64×64 and a depth of 0 is a prediction unit, the prediction unit may be split into a partition 610 having the size of 64×64, partitions 612 having a size of 64×32, partitions 614 having a size of 32×64, or partitions 616 having the size of 32×32.

Likewise, a prediction unit of the coding unit 620 having the size of 32×32 and a depth of 1 may be split into a partition 620 having the size of 32×32, partitions 622 having a size of 32×16, partitions 624 having a size of 16×32, or partitions 626 having the size of 16×16.

Furthermore, a prediction unit of the coding unit 630 having the size of 16×16 and a depth of 2 may be split into a partition 630 having the size of 16×16, partitions 632 having a size of 16×8, partitions 634 having a size of 8×16, or partitions 636 having the size of 8×8.

Also, a prediction unit of the coding unit 640 having the size of 8×8 and a depth of 3 may be split into a partition 640 having the size of 8×8, partitions 642 having a size of 8×4, partitions 644 having a size of 4×8, or partitions 646 having a size of 4×4.

Finally, the coding unit 650 having the size of 4×4 and a depth of 4 is a minimum coding unit and a coding unit of the lowest depth, and a corresponding prediction unit may also be set as only a partition 650 having the size of 4×4.

The coding unit determination unit 120 of the video encoding apparatus 100 according to an exemplary embodiment may encode every coding units of each depth, which are included in the maximum coding unit 610, to determine a coded depth of the maximum coding unit 610.

The number of coding units per depth for containing data of a same range and a same size increases as a depth deepens. For example, for data included in one coding unit having a depth of 1, four coding units having a depth of 2 are used. Therefore, to compare an encoding result of same data for each depth, the same data may be encoded by individually using one coding unit having a depth of 1 and four coding units having a depth of 2.

For encoding for each depth, a representative encoding error that is the smallest encoding error in a corresponding depth may be selected by encoding every prediction units of coding units per depth along the horizontal axis of the hierarchical structure 600 of coding units. In addition, a depth is getting deeper along the vertical axis of the hierarchical structure 600 of coding units, and a minimum encoding error may be retrieved by comparing representative encoding errors per depth after performing encoding for each depth. A depth and a partition in which the minimum encoding error has occurred in the maximum coding unit 610 may be selected as a coded depth and a partition type of the maximum coding unit 610.

FIG. 7 illustrates a relationship between a coding unit and a transformation unit, according to an exemplary embodiment.

The video encoding apparatus 100 according to an exemplary embodiment or the video decoding apparatus 200 according to an exemplary embodiment encodes or decodes an image in coding units that are less than or equal to a maximum coding unit for each maximum coding unit. A size of a transformation unit for frequency transformation in an encoding operation may be selected based on a data unit that is not greater than each coding unit.

For example, when a current coding unit 710 has a size of 64×64, the video encoding apparatus 100 according to an exemplary embodiment or the video decoding apparatus 200 according to an exemplary embodiment may perform frequency transformation by using a transformation unit 720 having a size of 32×32.

In addition, data of the coding unit 710 having the size of 64×64 may be encoded by performing frequency transformation on each of transformation units having sizes of 32×32, 16×16, 8×8, and 4×4 that are less than the size of 64×64, and thereafter, a transformation unit in which the smallest encoding error has occurred may be selected.

FIG. 8 illustrates encoding information per depth, according to an exemplary embodiment.

The output unit 130 of the video encoding apparatus 100 according to an exemplary embodiment may encode and transmit information 800 on a partition type, information 810 on a prediction mode, and information 820 on a transformation unit size as information on an encoding mode for each coding unit of each coded depth.

The information 800 on a partition type indicates information on a shape of partitions obtained by splitting a prediction unit of a current coding unit, as a data unit for prediction encoding on the current coding unit. For example, a current coding unit CU_0 having a size of 2N×2N may be used by being split in any one type from among a partition 802 having the size of 2N×2N, partitions 804 having a size of 2N×N, partitions 806 having a size of N×2N, and partitions 808 having a size of N×N. In this case, the information 800 on a partition type of the current coding unit is set so as to indicate one of the partition 802 having the size of 2N×2N, the partitions 804 having the size of 2N×N, the partitions 806 having the size of N×2N, and the partitions 808 having the size of N×N.

The information 810 on a prediction mode indicates a prediction mode of each partition. For example, based on the information 810 on a prediction mode, it may be set which one of an intra mode 812, an inter mode 814, and a skip mode 816 is used to perform prediction encoding on a partition indicated by the information 800 on a partition type.

The information 820 on a transformation unit size indicates which transformation unit is used to perform frequency transformation on the current coding unit. For example, a transformation unit may be a first intra transformation unit size 822, a second intra transformation unit size 824, a first inter transformation unit size 826, or a second inter transformation unit size 828.

The image data and encoding information extraction unit 220 of the video decoding apparatus 200 according to an exemplary embodiment may extract the information 800 on a partition type, the information 810 on a prediction mode, and the information 820 on a transformation unit size for each coding unit of each coded depth and use the extracted information 800, 810, and 820 in decoding.

Figure 9:
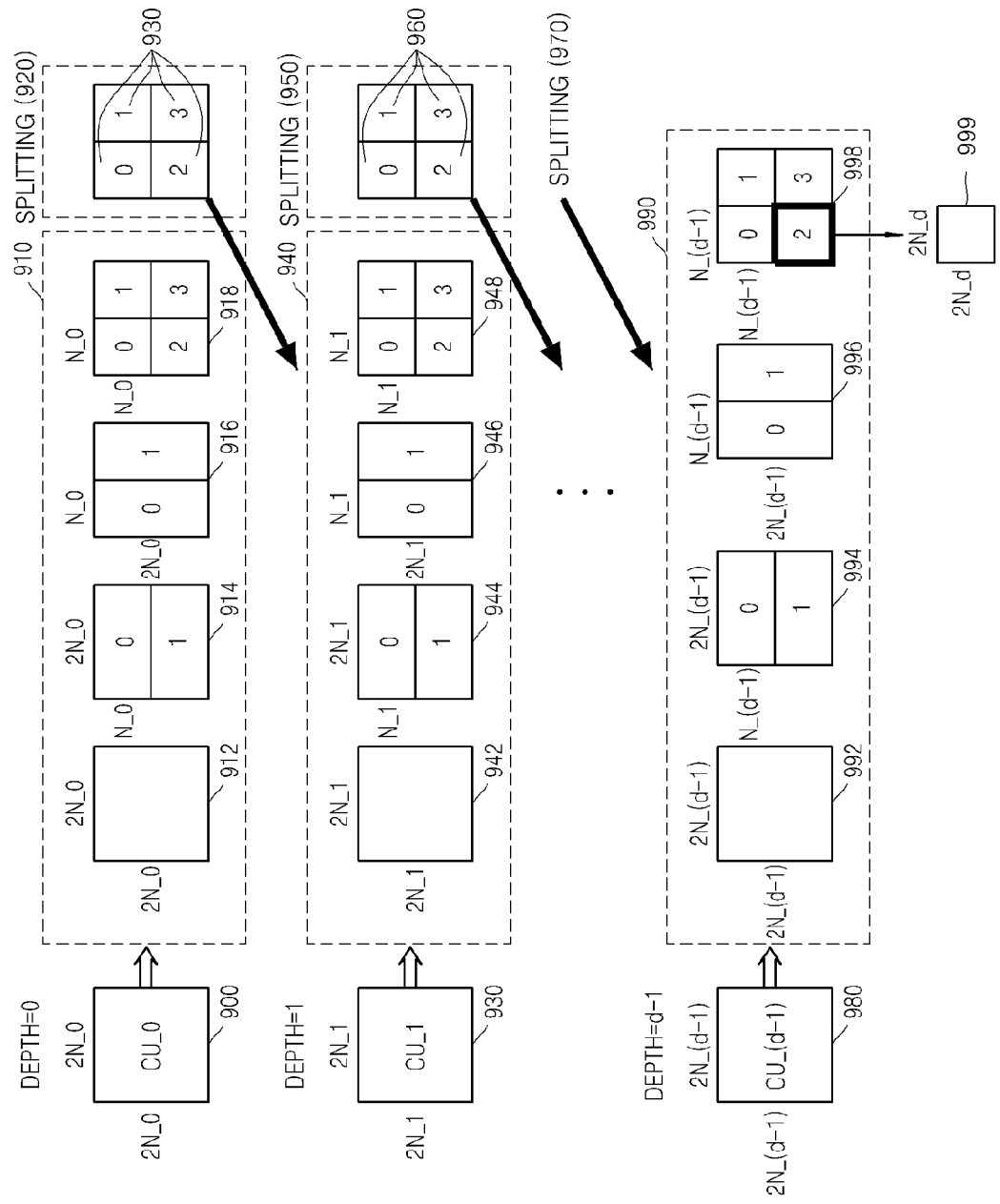
FIG. 9 illustrates coding units per depth, according to an exemplary embodiment.

FIG. 9 illustrates coding units per depth, according to an exemplary embodiment.

Split information may be used to indicate a change in a depth. The split information indicates whether a coding unit of a current depth is split into coding units of a lower depth.

A prediction unit 910 for prediction encoding on a coding unit 900 having a depth of 0 and a size of 2N_0×2N_0 may include a partition type 912 having the size of 2N_0×2N_0, a partition type 914 having a size of 2N_0×N_0, a partition type 916 having a size of N_0×2N_0, and a partition type 918 having a size of N_0×N_0. Although only partitions obtained by symmetrically splitting the prediction unit 910 are illustrated, as described above, partition types are not limited thereto and may include an asymmetrical partition, a partition having a random shape, a partition having a geometric shape, and the like.

For each partition type, prediction encoding may be repeatedly performed on one partition having the size of 2N_0×2N_0, two partitions having the size of 2N_0×N_0, two partitions having the size of N_0×2N_0, and four partitions having the size of N_0×N_0. Prediction encoding on the partitions having sizes of 2N_0×2N_0, 2N_0×N_0, N_0×2N_0, and N_0×N_0 may be performed in the intra mode or the inter mode. The skip mode may be applied only to prediction encoding on the partition having the size of 2N_0×2N_0.

If an encoding error in any one of the partition types 912, 914, and 916 having sizes of 2N_0×2N_0, 2N_0×N_0, and N_0×2N_0 is the smallest, splitting to a lower depth does not have to be performed any more.

If an encoding error in the partition type 918 having the size of N_0×N_0 is the smallest, splitting (refer to 920) is performed by changing the depth from 0 to 1, and a minimum encoding error may be searched for by repeatedly performing encoding on coding units 930 of a partition type having a depth of 2 and the size of N_0×2N_0.

A prediction unit 940 for prediction encoding on a coding unit 930 having a depth of 1 and a size of 2N_1×2N_1 (=N_0×N_0) may include a partition type 942 having the size of 2N_1×2N_1, a partition type 944 having a size of 2N_1×N_1, a partition type 946 having a size of N_1×2N_1, and a partition type 948 having a size of N_1×N_1.

In addition, if an encoding error in the partition type 948 having the size of N_1×N_1 is the smallest, splitting (refer to 950) is performed by changing the depth from 1 to 2, and a minimum encoding error may be searched for by repeatedly performing encoding on coding units 960 having a depth of 2 and a size of N_2×2N_2.

When the maximum depth is d, per-depth split information may be set up to a depth of d−1, and split information may be set up to a depth of d−2. That is, when splitting (refer to 970) is performed from a depth of d−2 and encoding is performed up to a depth of d−1, a prediction unit 990 for prediction encoding on a coding unit 980 having a depth of d−1 and a size of 2N_(d−1)×2N_(d−1) may include a partition type 992 having the size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1) 1.

A partition type in which a minimum encoding error has occurred may be retrieved from among the partition types 992, 994, 996, and 998 by repeatedly performing prediction encoding on one partition having the size of 2N_(d−1)×2N_(d−1), two partitions having the size of 2N_(d−1)×N_(d−1), two partitions having the size of N_(d−1)×2N_(d−1), and four partitions having the size of N_(d−1)×N_(d−1) 1.

Even though an encoding error in the partition type 998 having the size of N_(d−1)×N_(d−1) 1 is the smallest, a maximum depth is d, and thus, a coding unit CU_(d−1) having a depth of d−1 does not undergo a splitting operation to a lower depth any more. Accordingly, a coded depth of the current maximum coding unit 900 may be determined as a depth of d−1, and a partition type thereof may be determined as N_(d−1)×N_(d−1) 1. In addition, since the maximum depth is d, split information is not set for the coding unit 980 having a depth of d−1.

A data unit 999 may be referred to as "a minimum unit" for the current maximum coding unit 900. The minimum unit according to an exemplary embodiment may be a data unit of a regular quadrilateral having a size obtained by equally splitting a minimum coding unit of the lowest coded depth by four. Through this repeated encoding operation, the video encoding apparatus 100 according to an exemplary embodiment may determine a coded depth by comparing per-depth encoding errors of the coding unit 900 and selecting a depth in which the smallest encoding error occurs, and a corresponding partition type and prediction mode may be set as an encoding mode of the coded depth.

In this way, a coded depth may be selected by comparing minimum encoding errors of all depths of 0, 1, ... , d−1, and d with each other and selecting a depth in which the smallest encoding error occurs. The coded depth, a partition type of a prediction unit, and a prediction mode may be encoded as information on an encoding mode and transmitted. In addition, since coding units from a depth of 0 up to the coded depth are split, only split information of the coded depth may be set to "0" and per-depth split information except for the coded depth is set to "1".

The image data and encoding information extraction unit 220 of the video decoding apparatus 200 according to an exemplary embodiment may extract information on the coded depth and the prediction unit for the coding unit 900 and use the extracted information to decode the coding unit (partition type) 912. The video decoding apparatus 200 according to an exemplary embodiment may perceive a depth of which split information is "0" as the coded depth by using the per-depth split information and perform decoding by using information on an encoding mode in the corresponding depth.

Figure 10:
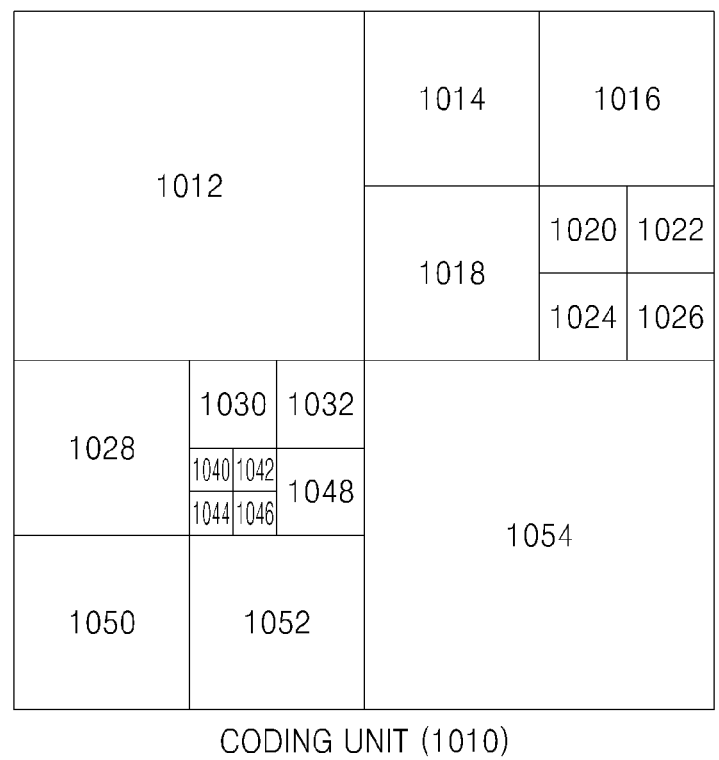
FIGS. 10, 11, and 12 illustrate a relationship among coding units, prediction units, and transformation units, according to an exemplary embodiment.
Figure 11:
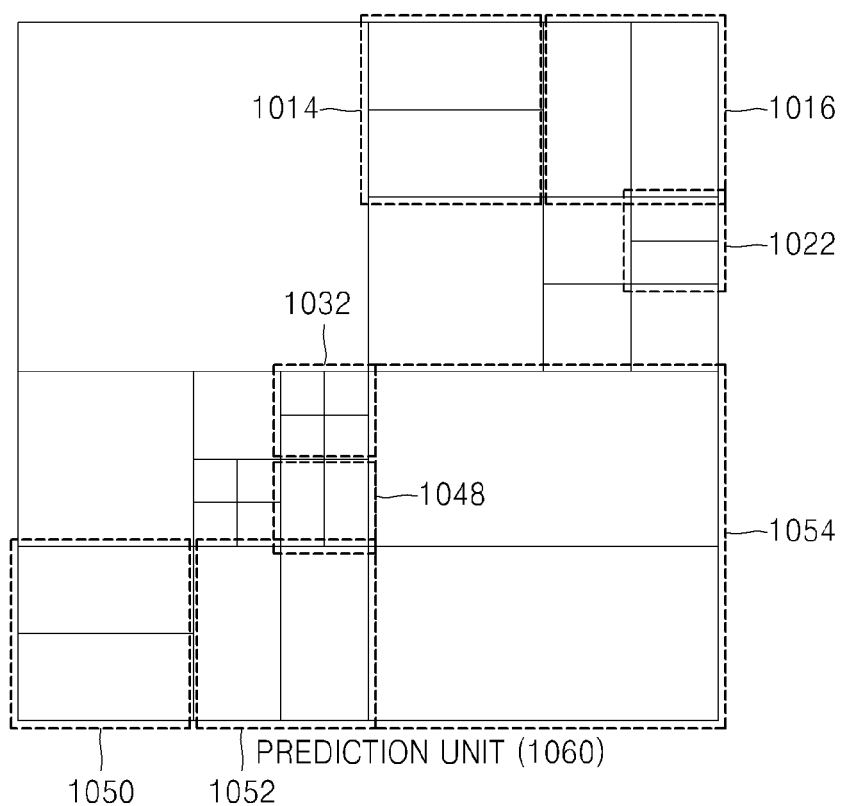
Figure 12:
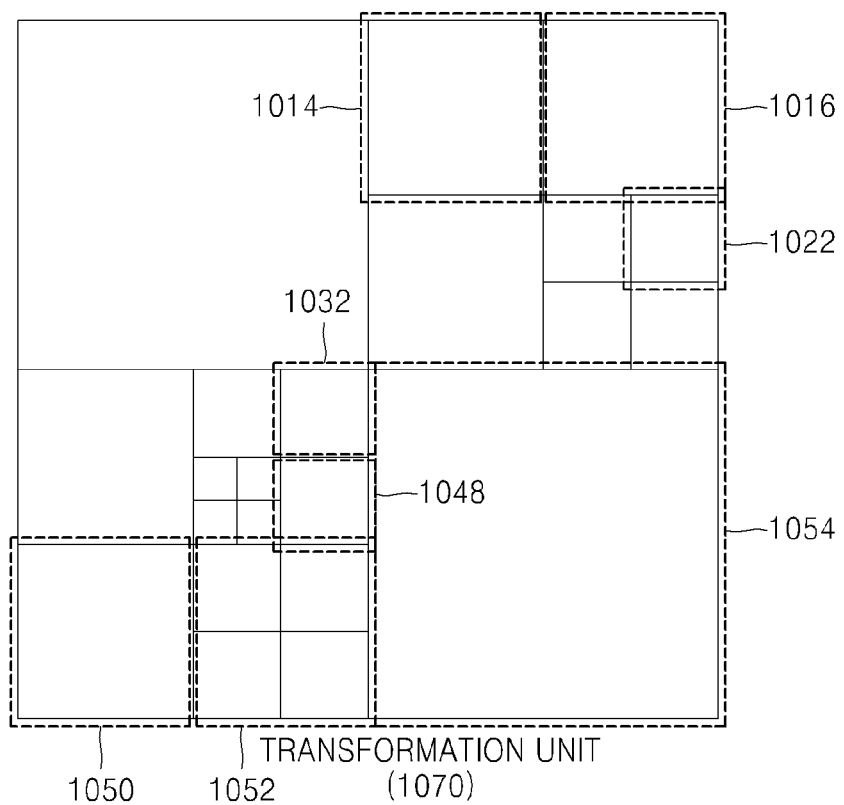

FIGS. 10, 11, and 12 illustrate a relationship among coding units 1010, prediction units 1060, and transformation units 1070, according to an exemplary embodiment.

The coding units 1010 are coding units per coded depth, which are determined by the video encoding apparatus 100 according to an exemplary embodiment, for a maximum coding unit. The prediction units 1060 are partitions of prediction units of coding units for each coded depth from among the coding units 1010, and the transformation units 1070 are transformation units of coding units for each coded depth.

For the coding units 1010 per coded depth, when a depth of a maximum coding unit is 0, coding units 1012 and 1054 have a depth of 1, coding units 1014, 1016, 1018, 1028, 1050, and 1052 have a depth of 2, coding units 1020, 1022, 1024, 1026, 1030, 1032, and 1048 have a depth of 3, and coding units 1040, 1042, 1044, and 1046 have a depth of 4.

Some partitions 1014, 1016, 1022, 1032, 1048, 1050, 1052, and 1054 in the prediction units 1060 have a shape in which a coding unit is split. That is, the partitions 1014, 1022, 1050, and 1054 have a partition type of 2N×N, the partitions 1016, 1048, and 1052 have a partition type of N×2N, and the partition 1032 has a partition type of N×N. Prediction units and partitions of the coding units 1010 per coded depth are less than or equal to each corresponding coding unit.

For image data of a portion 1052 of the transformation units 1070, frequency transformation or inverse frequency transformation is performed in a data unit that is less than a corresponding coding unit. In addition, compared with corresponding prediction units and partitions in the prediction units 1060, transformation units 1014, 1016, 1022, 1032, 1048, 1050, 1052, and 1054 are data units having difference sizes or shapes. That is, The video encoding apparatus 100 according to an exemplary embodiment and the video decoding apparatus 200 according to an exemplary embodiment may perform even an intra prediction/motion estimation/motion compensation operation and a frequency transformation/inverse frequency transformation operation for same coding units based on individual data units.

Accordingly, for each maximum coding unit, an optimal coding unit may be determined by recursively performing encoding on coding units of a hierarchical structure for each region, thereby forming coding units according to a recursive tree structure. Encoding information may include split information of coding units, partition type information, prediction mode information, and transformation unit size information. Table 1 shows an example which may be set by the video encoding apparatus 100 according to an exemplary embodiment and the video decoding apparatus 200 according to an exemplary embodiment.

TABLE 1

Split Information 0
(Encoding on Coding Unit having Size of 2Nx2N and Current Depth of d)

| | Partition Type | | Size of Transformation Unit | | |
|---|---|---|---|---|---|
| Prediction Mode | Symmetrical Partition Type | Asymmetrical Partition Type | Split Information 0 of Transformation Unit | Split Information 1 of Transformation Unit | Split Information 1 |
| Intra Inter Skip (Only 2Nx2N) | 2Nx2N 2NxN Nx2N NxN | 2NxnU 2NxnD nLx2N nRx2N | 2Nx2N | NxN (Symmetrical Type) N/2xN/2 (Asymmetrical Type) | Repeatedly Encode Coding Units having Lower Depth of d + 1 |

The output unit 130 of the video encoding apparatus 100 according to an exemplary embodiment may output encoding information on coding units according to a tree structure, and the image data and encoding information extraction unit 220 of the video decoding apparatus 200 according to an exemplary embodiment may extract the encoding information on the coding units according to a tree structure from a received bitstream.

Split information indicates whether a current coding unit is split into coding units of a lower depth. If split information of a current depth of d is 0, a depth in which a current coding unit is not split into a lower depth any more is a coded depth, and thus partition type information, a prediction mode, and transformation unit size information may be defined for the coded depth. If the current coding unit is further split according to the split information, encoding may be independently performed on four split coding units of a lower depth.

A prediction mode may be represented by one of the intra mode, the inter mode, and the skip mode. The intra mode and the inter mode may be defined in all partition types, and the skip mode is defined only in a partition type having a size of 2Nx2N.

The partition type information may indicate symmetrical partition types having sizes of 2Nx2N, 2NxN, Nx2N, and NxN, which are obtained by symmetrically splitting a height or a width of a prediction unit, and asymmetrical partition types having sizes of 2NxnU, 2NxnD, nLx2N, and nRx2N, which are obtained by asymmetrically splitting the height or width of the prediction unit. The asymmetrical partition types having sizes of 2NxnU and 2NxnD may be respectively obtained by splitting the height of the prediction unit in 1:3 and 3:1, and the asymmetrical partition types having sizes of nLx2N and nRx2N may be respectively obtained by splitting the width of the prediction unit in 1:3 and 3:1.

A size of a transformation unit may be set to be two types in the intra mode and two types in the inter mode. That is, if split information of a transformation unit is 0, the size of the transformation unit is set to 2Nx2N, which is the size of the current coding unit. If the split information of the transformation unit is 1, transformation units obtained by splitting the current coding unit may be set. In addition, if a partition type of the current coding unit having a size of 2Nx2N is a symmetrical partition type, a size of a transformation unit may be set to NxN, and if the partition type of the current coding unit is an asymmetrical partition type, the size of the transformation unit may be set to N/2xN/2.

Encoding information on coding units according to a tree structure according to an exemplary embodiment may be allocated to at least one of a coding unit of a coded depth, a prediction unit, and a minimum unit. The coding unit of the coded depth may include at least one of a prediction unit and a minimum unit containing same encoding information.

Therefore, it is determined whether adjacent data units are included in coding units of a same coded depth by checking encoding information of the adjacent data units. In addition, a corresponding coding unit of a coded depth is determined by using encoding information of a data unit, and thus, a distribution of coded depths in a maximum coding unit may be inferred.

Therefore, in this case, if a current coding unit is predicted be referring to adjacent data units, encoding information of data units in per-depth coding units adjacent to the current coding unit may be directly referred to and used.

According to another exemplary embodiment, if prediction encoding on a current coding unit is performed by referring to adjacent data units, data adjacent to the current coding unit are retrieved from a per-depth coding unit by using encoding information of adjacent per-depth coding units, and the adjacent coding units may be referred for the prediction encoding on the current coding unit.

Figure 13:
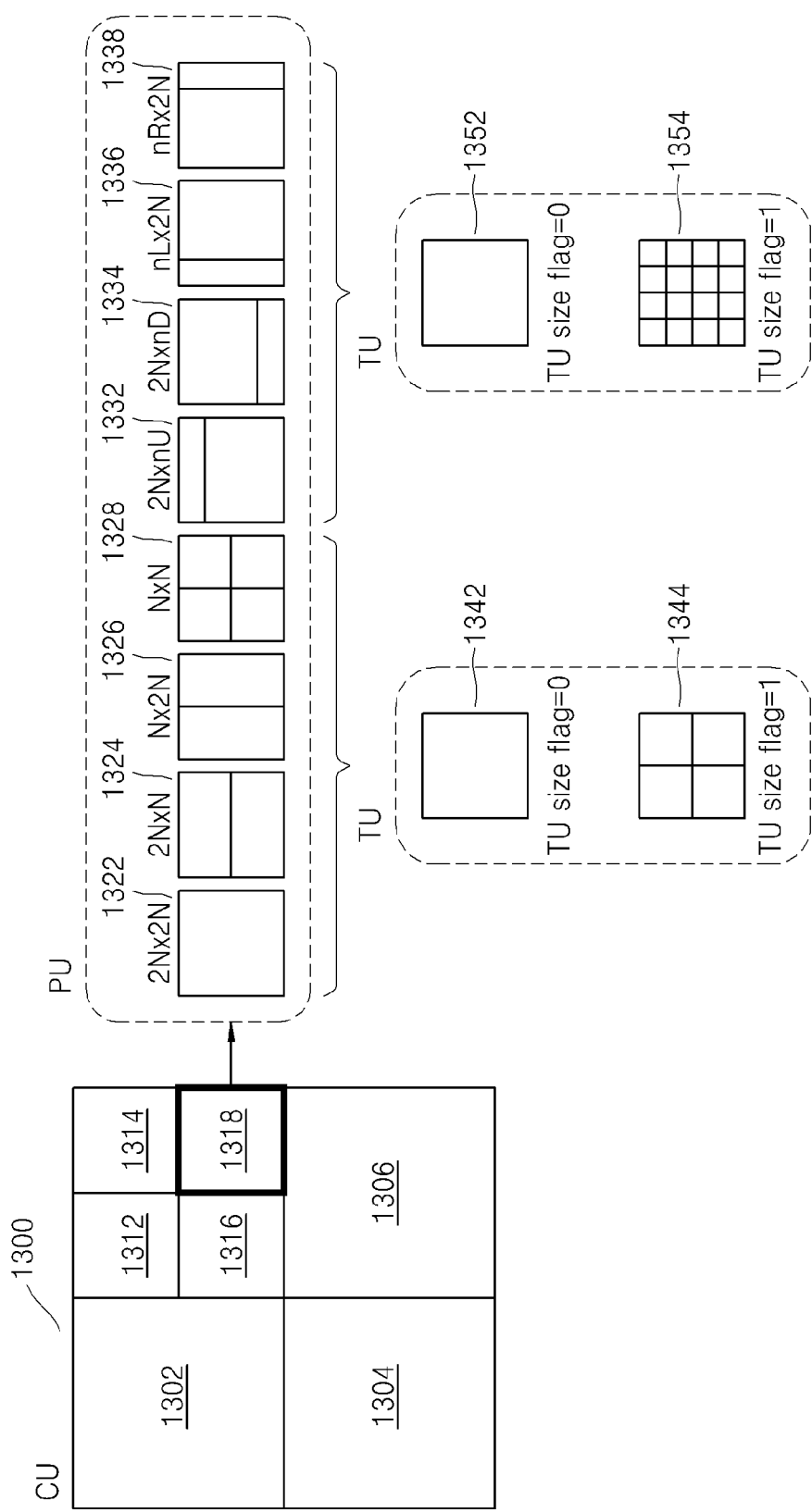
FIG. 13 illustrates a relationship among a coding unit, a prediction unit, and a transformation unit, according to encoding mode information of Table 1.

FIG. 13 illustrates a relationship among a coding unit, a prediction unit, and a transformation unit, according to encoding mode information of Table 1.

A maximum coding unit 1300 includes coding units 1302, 1304, 1306, 1312, 1314, 1316, and 1318 of coded depths. Since the coding unit 1318 is a coding unit of a coded depth, split information thereof may be set to 0. Partition type information of the coding unit 1318 having a size of 2Nx2N may be set to one of a partition type 1322 having the size of 2Nx2N, a partition type 1324 having a size of 2NxN, a partition type 1326 having a size of Nx2N, a partition type 1328 having a size of NxN, a partition type 1332 having a size of 2NxnU, a partition type 1334 having a size of 2NxnD, a partition type 1336 having a size of nLx2N, and a partition type 1338 having a size of nRx2N.

When the partition type information is set to be symmetrical, i.e., the partition type 1322 having the size of 2Nx2N, the partition type 1324 having the size of 2NxN, the partition type 1326 having the size of Nx2N, or the partition type 1328 having the size of NxN, a transformation unit 1342 having the size of 2Nx2N may be set if transformation unit split information (TU size flag) is 0, and a transformation unit 1344 having the size of NxN may be set if the TU size flag is 1.

When the partition type information is set to be asymmetrical, i.e., the partition type 1332 having the size of 2N×nU, the partition type 1334 having the size of 2N×nD, the partition type 1336 having the size of nL×2N, or the partition type 1338 having the size of nR×2N, a transformation unit 1352 having the size of 2N×2N may be set if the TU size flag is 0, and a transformation unit 1354 having a size of N/2×N/2 may be set if the TU size flag is 1.

Hereinafter, an intra prediction operation performed by the intra prediction unit 410 of the video encoding apparatus 100 of FIG. 4 will be described in detail.

Figure 14:
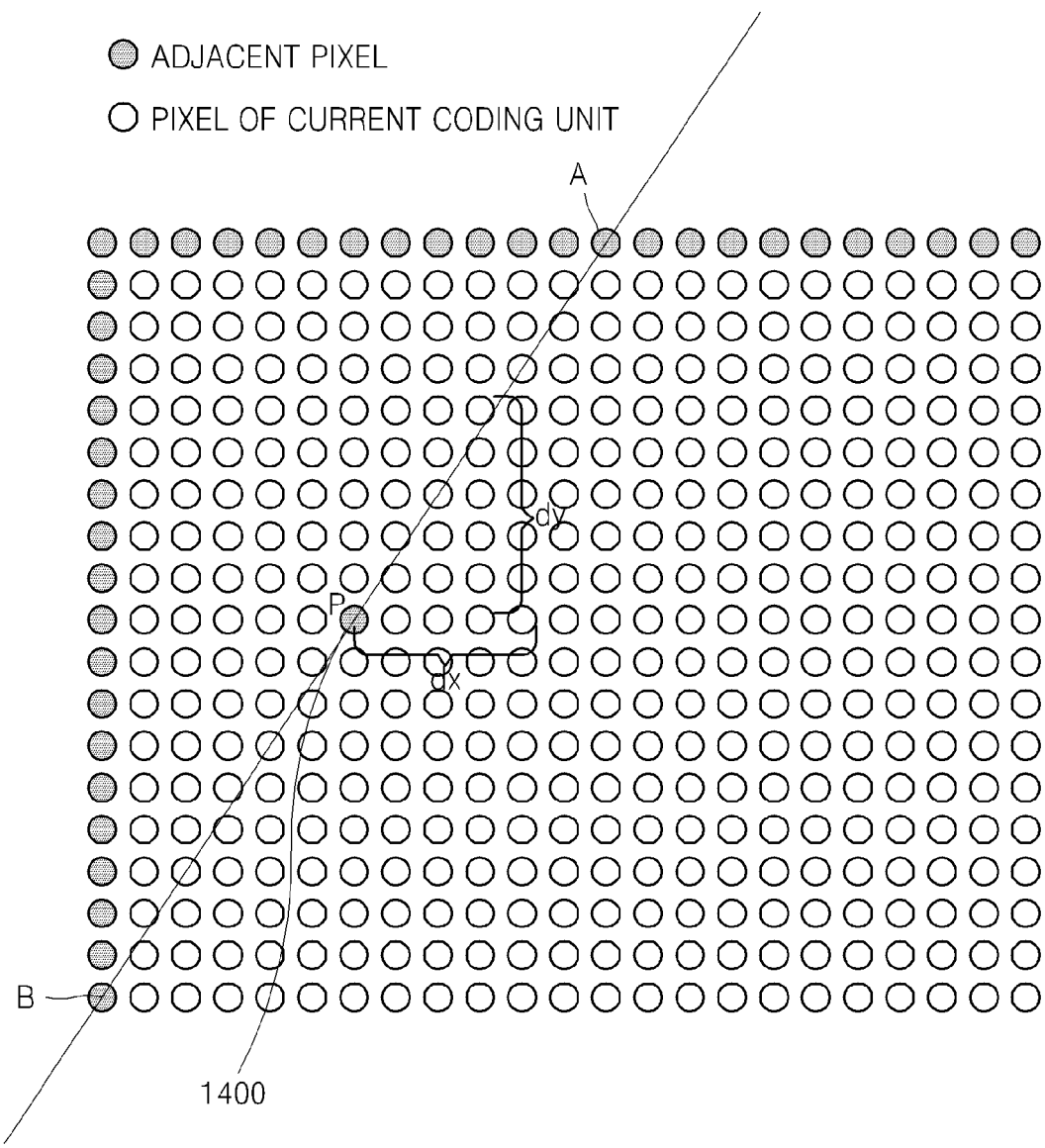
FIG. 14 is a reference diagram for describing intra prediction modes having various directivities, according to an exemplary embodiment.

FIG. 14 is a reference diagram for describing intra prediction modes having various directivities, according to an exemplary embodiment.

In the intra prediction modes according to an exemplary embodiment, adjacent reference pixels may be determined using a line having a gradient of $\tan^{-1}$ (dy/dx) determined using a plurality of parameters (dx, dy), and a predicted value may be acquired using the determined adjacent reference pixels.

For example, prediction modes having directivities of $\tan^{-1}$(dy/dx) using (dx, dy) may be defined by parameters (dx, dy) illustrated in Tables 2, 3, and 4.

TABLE 2

| dx  | Dy | dx | dy  | dx | dy |
|-----|----|----|-----|----|-----|
| −32 | 32 | 21 | 32  | 32 | 13 |
| −26 | 32 | 26 | 32  | 32 | 17 |
| −21 | 32 | 32 | 32  | 32 | 21 |
| −17 | 32 | 32 | −26 | 32 | 26 |
| −13 | 32 | 32 | −21 | 32 | 32 |
| −9  | 32 | 32 | −17 |    |    |
| −5  | 32 | 32 | −13 |    |    |
| −2  | 32 | 32 | −9  |    |    |
| 0   | 32 | 32 | −5  |    |    |
| 2   | 32 | 32 | −2  |    |    |
| 5   | 32 | 32 | 0   |    |    |
| 9   | 32 | 32 | 2   |    |    |
| 13  | 32 | 32 | 5   |    |    |
| 17  | 32 | 32 | 9   |    |    |

TABLE 3

| dx  | Dy | dx | dy  | dx | dy |
|-----|----|----|-----|----|-----|
| −32 | 32 | 19 | 32  | 32 | 10 |
| −25 | 32 | 25 | 32  | 32 | 14 |
| −19 | 32 | 32 | 32  | 32 | 19 |
| −14 | 32 | 32 | −25 | 32 | 25 |
| −10 | 32 | 32 | −19 | 32 | 32 |
| −6  | 32 | 32 | −14 |    |    |
| −3  | 32 | 32 | −10 |    |    |
| −1  | 32 | 32 | −6  |    |    |
| 0   | 32 | 32 | −3  |    |    |
| 1   | 32 | 32 | −1  |    |    |
| 3   | 32 | 32 | 0   |    |    |
| 6   | 32 | 32 | 1   |    |    |
| 10  | 32 | 32 | 3   |    |    |
| 14  | 32 | 32 | 6   |    |    |

TABLE 4

| dx  | Dy | dx | dy  | dx | dy |
|-----|----|----|-----|----|-----|
| −32 | 32 | 23 | 32  | 32 | 15 |
| −27 | 32 | 27 | 32  | 32 | 19 |
| −23 | 32 | 32 | 32  | 32 | 23 |
| −19 | 32 | 32 | −27 | 32 | 27 |
| −15 | 32 | 32 | −23 | 32 | 32 |

TABLE 4-continued

| dx  | Dy | dx | dy  | dx | dy |
|-----|----|----|-----|----|-----|
| −11 | 32 | 32 | −19 |    |    |
| −7  | 32 | 32 | −15 |    |    |
| 3   | 32 | 32 | −11 |    |    |
| 0   | 32 | 32 | −7  |    |    |
| 3   | 32 | 32 | −3  |    |    |
| 7   | 32 | 32 | 0   |    |    |
| 11  | 32 | 32 | 3   |    |    |
| 15  | 32 | 32 | 7   |    |    |
| 19  | 32 | 32 | 11  |    |    |

Referring to FIG. 14, adjacent pixels A and B located in an extension line 1400 having an angle of $\tan^{-1}$(dy/dx) defined depending on a value of (dx, dy) based on a current pixel P to be predicted in a current prediction unit may be used as predictors of the current pixel P. In this case, an adjacent pixel used as a predictor may be a pixel of a previous prediction unit that is pre-encoded and pre-restored and is located either up, left, upper right, or lower left of the current prediction unit. In addition, when the extension line 1400 passes between adjacent pixels at integer locations instead of through an adjacent pixel at an integer location, an adjacent pixel closer to the current pixel P from among the adjacent pixels close to the extension line 1400 may be used as a predictor of the current pixel P, or a weighted mean value in consideration of distances of a cross point between the extension line 1400 and the adjacent pixels close to the extension line 1400 may be used as a predictor of the current pixel P. As such, an intra prediction mode in which adjacent pixels are determined by using an extension line having a predetermined directivity based on a current pixel is defined as an angular mode.

Figure 15:
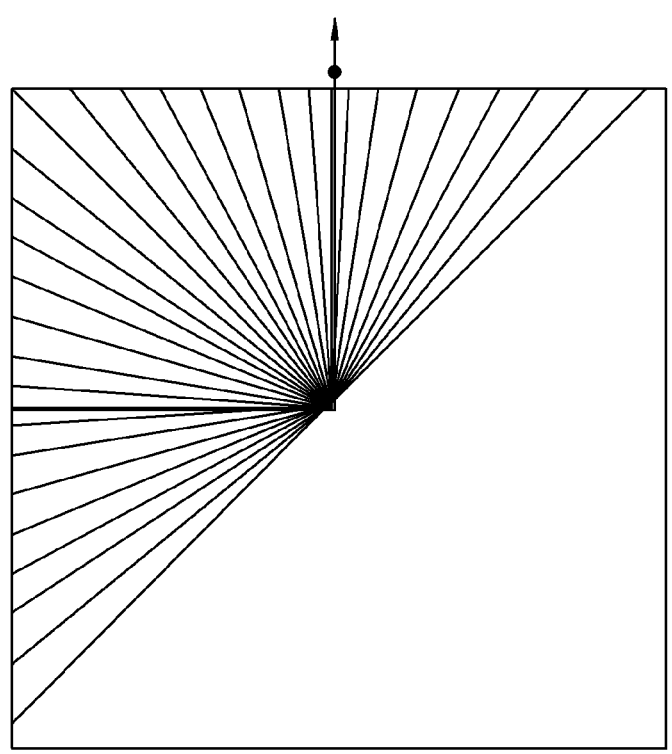
FIG. 15 illustrates an angular mode according to an exemplary embodiment.

FIG. 15 illustrates the angular mode according to an exemplary embodiment.

Referring to FIG. 15, the angular mode may have a total of 33 directivities including vertical and horizontal directions. In the angular mode, adjacent pixels according to the 33 directivities based on a current pixel are determined, and a determined adjacent pixel is determined as a prediction value of the current pixel.

An intra prediction mode according to an exemplary embodiment may include a total of 35 intra prediction modes including the angular mode having 33 directivities, a planar mode, and a DC mode.

The number of intra prediction modes to be applied to a prediction unit according to a size of the prediction unit may be set. For example, the 35 intra prediction modes may be applied to each of prediction units having sizes of 4×4. 8×8, 16×16, 32×32, and 64×64. The intra prediction mode according to an exemplary embodiment supports more directivities than an intra prediction mode used in related art H.264/AVC. In addition, as described above, according to an exemplary embodiment, prediction units having various sizes are used. Therefore, the number of intra prediction modes of which a rate distortion (RD) cost is calculated to determine an optimal intra prediction mode for one maximum coding unit is very large.

For example, to determine an optimal intra prediction mode for a maximum coding unit having a size of 64×64, it is assumed that the maximum coding unit is split into prediction units having sizes of 4×4. 8×8, 16×16, 32×32, and 64×64, and the 35 intra prediction modes are usable for each of the prediction units. In this case, the number of intra prediction modes of which an RD cost is calculated according to the sizes of the prediction units included in the maximum coding unit having the size of 64×64 is as below:

(1) Prediction unit having the size of 64×64: 35 intra prediction modes;

(2) Prediction units having a size of 32×32: 35×4=140 intra prediction modes;

(3) Prediction units having a size of 16×16: 35×4×4=560 intra prediction modes;

(4) Prediction units having a size of 8×8: 35×4×4×4=2240 intra prediction modes;

(5) Prediction units having a size of 4×4: 35×4×4×4×4=8960 intra prediction modes To determine an optimal intra prediction mode for a maximum coding unit having the size of 64×64, a total of 11,935 intra prediction modes are applied. As such, when an optimal intra prediction mode for one maximum coding unit is determined, much processing time is consumed for an RD cost calculation operation.

Therefore, in a method of determining an intra prediction mode, according to an exemplary embodiment, a maximum coding unit is split into small-sized coding units, and edges of the small-sized coding units are analyzed. In addition, in the method of determining an intra prediction mode, according to an exemplary embodiment, when all of the small-sized coding units have a same edge direction based on the analyzed edges, intra prediction is performed using a relatively large coding unit. As described above, in the method of determining an intra prediction mode, according to an exemplary embodiment, sizes of coding units to be used for intra prediction on a maximum coding unit may be limited based on edge components of small-sized coding units, thereby quickly performing an intra prediction mode determination operation.

Figure 16:
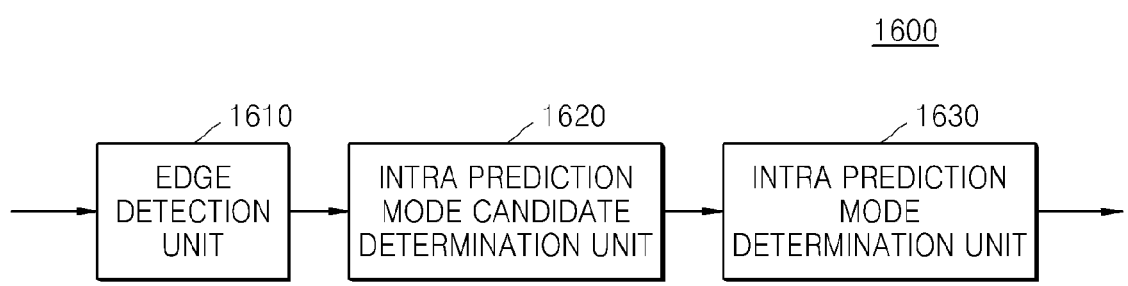
FIG. 16 is a block diagram of an apparatus for determining an intra prediction mode, according to an exemplary embodiment.

FIG. 16 is a block diagram of an apparatus 1600 for determining an intra prediction mode, according to an exemplary embodiment.

The apparatus 1600 of FIG. 16 corresponds to the intra prediction unit 410 of the video encoding apparatus 100.

Referring to FIG. 16, the apparatus 1600 includes an edge detection unit 1610 (e.g., edge detector), an intra prediction mode candidate determination unit 1620 (e.g., intra prediction mode candidate determiner), and an intra prediction mode determination unit 1630 (e.g., intra prediction mode determiner).

The edge detection unit 1610 splits a maximum coding unit into coding units having a first size and acquires an edge direction of each of the coding units having the first size. The coding unit having the first size has a smaller size than the maximum coding unit, and the first size may be selected from among sizes of coding units smaller than the maximum coding unit. For example, the first size may be 4×4.

The intra prediction mode candidate determination unit 1620 groups adjacent coding units having the first size into an intra prediction coding unit group based on the uniformity of edge directions of the adjacent coding units having the first size from among the coding units having the first size. Thereafter, the intra prediction mode candidate determination unit 1620 determines a size range of coding units to be applied to intra prediction on the intra prediction coding unit group. The intra prediction coding unit group may be defined so as to have a region to which coding units in a same size range are applied in intra prediction, e.g., a region having a regular quadrilateral shape of 2m×2m (m is an integer).

When a size of the maximum coding unit is 2N×2N (N is an integer), if all coding units having the first size, which are included in the maximum coding unit, have a same edge direction, the intra prediction mode candidate determination unit 1620 may determine the maximum coding unit as one intra prediction coding unit group and determine a maximum size of coding units to be applied to intra prediction on the maximum coding unit as 2N×2N. A minimum size of the coding units to be applied to intra prediction on the maximum coding unit may be arbitrarily set. For example, it is assumed that the size of the maximum coding unit is 64×64, the first size is 4×4, and all coding units having a size of 4×4, which are included in the maximum coding unit, have a same edge direction. In this case, the maximum size of coding units to be applied to intra prediction on the maximum coding unit is set to 64×64. The minimum size of the coding units to be applied to intra prediction on the maximum coding unit may be set to 16×16. That is, when coding units having the size of 4×4, which are included in the maximum coding unit, have a same edge direction, the maximum coding unit is intra-predicted using coding units having sizes of 64×64 to 16×16. If all the coding units having the size of 4×4, which are included in the maximum coding unit, have a same edge direction, there is a high possibility that pixels included in the maximum coding unit have common directivity. Therefore, intra prediction may not be performed on too small coding units having sizes of 8×8 and 4×4.

When the minimum size of coding units to be applied to intra prediction increases, prediction efficiency may decrease, but a processing time taken to determine an intra prediction mode may decrease. On the contrary, when the minimum size decreases, prediction efficiency may increase, but a processing time taken to determine an intra prediction mode may increase as well.

According to an exemplary embodiment, when a size range of coding units to be applied to intra prediction on one intra prediction coding unit group, only coding units having a regular quadrilateral shape may be determined as coding units to be applied to the intra prediction to quickly determine an intra prediction mode. For example, when a size range of coding units to be applied to intra prediction on a maximum coding unit is 64×64 to 16×16, coding units having sizes of 64×64, 32×32, and 16×16, which are included in the size range and have a regular quadrilateral shape, are determined as the coding units to be applied to the intra prediction on the maximum coding unit.

If not all of the coding units having the first size, which are included in the maximum coding unit, have a same edge direction, the intra prediction mode candidate determination unit 1620 determines whether all coding units having the first size, which are included in a coding unit having a size of (2N/(2^n))×(2N/(2^n)) obtained by equally splitting the maximum coding unit by four n times (n is an integer), have a same edge direction. If all the coding units having the first size, which are included in the coding unit having the size of (2N/(2^n))×(2N/(2^n)), have a same edge direction, the intra prediction mode candidate determination unit 1620 may determine the coding unit having the size of (2N/(2^n))×(2N/(2^n)) as one intra prediction coding unit group and determine a maximum size of coding units to be applied to intra prediction on the coding unit having the size of (2N/(2^n))×(2N/(2^n)) as (2N/(2^n))×(2N/(2^n)). A minimum size of the coding units to be applied to intra prediction on the coding unit having the size of (2N/(2^n))×(2N/(2^n)) may be arbitrarily set.

For example, it is assumed that coding units having a size of 4×4 and having different edge directions exist from among coding units having the size of 4×4, which are included in the maximum coding unit having the size of 64×64. In this case, the intra prediction mode candidate determination unit 1620 determines whether coding units having the size of 4×4, which are included in each of coding units having the size of 32×32 obtained by equally splitting the maximum coding unit by four, have a same edge direction. If all the coding units having the size of 4×4, which are included in a coding unit having the size of 32×32, have a same edge direction, the intra prediction mode candidate determination unit 1620 may determine the coding unit having the size of 32×32 as one intra prediction coding unit group and determine a maximum size of coding units to be applied to intra prediction on the coding unit having the size of 32×32 as 32×32. A minimum size of the coding units to be applied to intra prediction on the coding unit having the size of 32×32 may be arbitrarily set. For example, for intra prediction on a coding unit having the size of 32×32, which includes coding units having the size of 4×4 and having a same edge direction, coding units having sizes of 32×32 to 8×8 may be used. For quick intra prediction, coding units having the sizes of 32×32, 16×16, and 8×8 included in the size range of 32×32 to 8×8 and having a regular quadrilateral shape may be determined as sizes of coding units to be applied to the intra prediction on the coding unit having the size of 32×32.

If not all of coding units having the size of 4×4, which are included in a coding unit having the size of 32×32, have a same edge direction, the intra prediction mode candidate determination unit 1620 may determine coding units included in a coding unit having the size of 16×16 obtained by equally splitting the coding unit having the size of 32×32 by four as one intra prediction coding unit group. However, when a size of an intra prediction coding unit group is small, an intra prediction mode determination operation may not be quickly performed. In order to prevent a size of an intra prediction coding unit group from being smaller than a predetermined threshold size, when edge directions of coding units having the size of 4×4, which are included in a coding unit having the predetermined threshold size, are not uniform, the intra prediction mode candidate determination unit 1620 may determine the coding unit having the predetermined threshold size as one intra prediction coding unit group and decrease sizes of coding units to be applied to intra prediction on the coding unit having the predetermined threshold size. For example, it is assumed that the size of 32×32 is a threshold size of an intra prediction coding unit group. If not all of coding units having the size of 4×4, which are included in a coding unit having the size of 32×32, have a same edge direction, the intra prediction mode candidate determination unit 1620 may determine the coding unit having the size of 32×32 as one intra prediction coding unit group and determine sizes of coding units to be applied to intra prediction on the coding unit having the size of 32×32 as 16×16 and 8×8.

The intra prediction mode determination unit 1630 performs intra prediction on an intra prediction coding unit group by using coding units having sizes included in a size range of coding units to be applied to the intra prediction. For example, when all coding units having the size of 4×4, which are included in a maximum coding unit having the size of 64×64, have a same edge direction, the maximum coding unit is determined as one intra prediction coding unit group, and the intra prediction mode determination unit 1630 performs intra prediction on the maximum coding unit by using coding units having the sizes of 64×64, 32×32, and 16×16.

As another example, when coding units having the size of 4×4 and having different edge directions exist from among coding units having the size of 4×4, which are included in a maximum coding unit having the size of 64×64, and edge directions of coding units having the size of 4×4, which are included in a coding unit having the size of 32×32 obtained by equally splitting the maximum coding unit by four, are all the same, the intra prediction mode determination unit 1630 determines the coding unit having the size of 32×32 as an intra prediction coding unit group and performs intra prediction on the coding unit having the size of 32×32 by using coding units having the sizes of 32×32, 16×16, and 8×8.

As another example, when not all of coding units having the size of 4×4, which are included in a coding unit having the size of 32×32, have a same edge direction, the coding unit having the size of 32×32 is determined as one intra prediction coding unit group, and the intra prediction mode determination unit 1630 performs intra prediction on the coding unit having the size of 32×32 by using coding units having the sizes of 16×16 and 8×8.

If edge directions of coding units having the size of 4×4, which are included in a coding unit having the size of 8×8, are not uniform, the intra prediction mode determination unit 1630 may perform intra prediction by using coding units having the size of 4×4 obtained by splitting the coding unit having the size of 8×8.

The intra prediction mode determination unit 1630 determines an optimal coding unit size for intra prediction and an intra prediction mode per coding unit by comparing costs according to the intra prediction on coding units having sizes included in a size range of coding units to be applied to the intra prediction.

For the costs, sum of absolute difference (SAD) or sum of absolute transformed difference (SATD) may be used.

Figure 17:
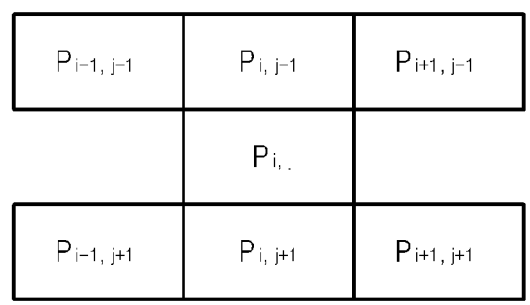
FIG. 17 is a reference diagram for describing an operation of detecting an edge direction of each pixel included in a coding unit, according to an exemplary embodiment.

FIG. 17 is a reference diagram for describing an operation of detecting an edge direction of each pixel included in a coding unit, according to an exemplary embodiment.

The edge detection unit 1610 may acquire a degree of a horizontal direction difference value and a degree of a vertical direction difference value of each pixel included in a coding unit having the size of 4×4 by using a predetermined edge detection algorithm. The predetermined edge detection algorithm may be a Sobel algorithm.

Referring to FIG. 17, when a pixel located at (i, j) (i and j are integers), for which an edge direction is to be detected, is $P_{i,j}$, a degree $dx_{i,j}$ of a horizontal direction difference value and a degree $dy_{i,j}$ of a vertical direction difference value of $P_{i,j}$ may be determined as below by considering pixel value differences between $P_{i,j}$ and adjacent pixels.

$$dx_{i,j}=P_{i-1,j+1}+2*P_{i,j+1}+P_{i+1,j+1}-P_{i-1,j+1}-2*P_{i,j-1}-P_{i+1,j-1}$$

$$dy_{i,j}=P_{i+1,j-1}+2*P_{i+1,j}+P_{i+1,j+1}-P_{i-1,j-1}-2*P_{i-1,j}-P_{i-1,j+1}$$

where ($dy_{i,j}/dx_{i,j}$) denotes a gradient of the pixel $P_{i,j}$. The edge detection unit 1610 determines a leading edge direction of pixels included in a coding unit having the first size based on the degree $dx_{i,j}$ of a horizontal direction difference value and the degree $dy_{i,j}$ of a vertical direction difference value of each pixel.

In detail, when the degree of a horizontal direction difference value is $dx_{i,j}$ and the degree of a vertical direction difference value of each pixel $dy_{i,j}$, the edge detection unit 1610 maps an edge direction of each pixel to one of preset predetermined edge directions based on ($dy_{i,j}/dx_{i,j}$). Thereafter, the edge detection unit 1610 determines a histogram of mapped edge directions of pixels included in coding units having the first size. The edge detection unit 1610 measures an edge strength based on a sum of an absolute value of the degree $dx_{i,j}$ of a horizontal direction difference value and an absolute value of the degree $dy_{i,j}$ of a vertical direction difference value, and if the edge strength is less than or equal to a predetermined threshold value, the edge detection unit 1610 may determine that an edge direction of a corresponding pixel does not exist.

Figure 18A:
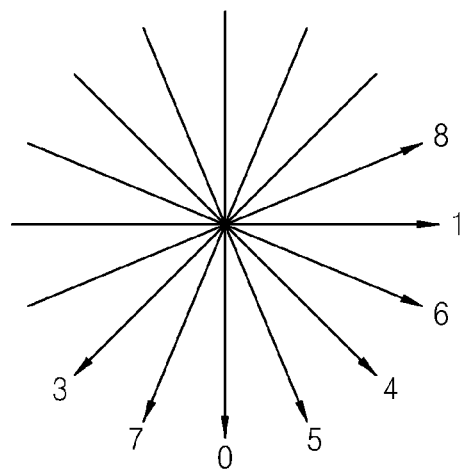
FIGS. 18A and 18B illustrate representative edge directions used for edge direction detection, according to an exemplary embodiment.
Figure 18B:
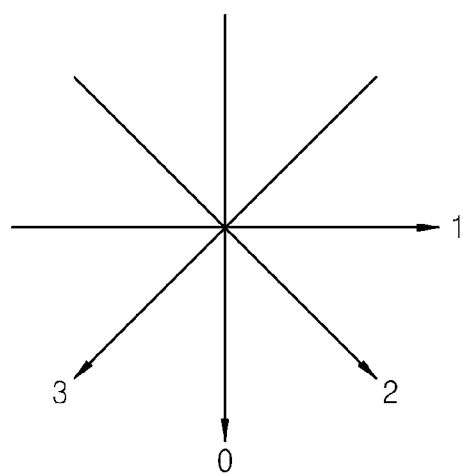

FIGS. 18A and 18B illustrate representative edge directions used for edge direction detection, according to an exemplary embodiment.

Referring to FIGS. 18A and 18B, the edge detection unit 1610 sets a horizontal direction 1, a vertical direction 0, a 45° direction, and a 135° direction as representative edge directions and maps an edge direction of each pixel to the closest one of the representative edge directions based on the degree $dx_{i,j}$ of a horizontal direction difference value and an absolute value of the degree $dy_{i,j}$ of a vertical direction difference value. A representative edge direction based on the degree $dx_{i,j}$ of a horizontal direction difference value and an absolute value of the degree $dy_{i,j}$ of a vertical direction difference value may be pre-determined in a lookup table form. Alternatively, a representative edge direction of each pixel may be determined by a predetermined function based on the degree $dx_{i,j}$ of a horizontal direction difference value and an absolute value of the degree $dy_{i,j}$ of a vertical direction difference value.

The edge detection unit 1610 maps an edge direction of each pixel included in a coding unit having the first size to one of the representative edge directions and determines a histogram indicating a frequency of the mapped edge direction.

Figure 19:
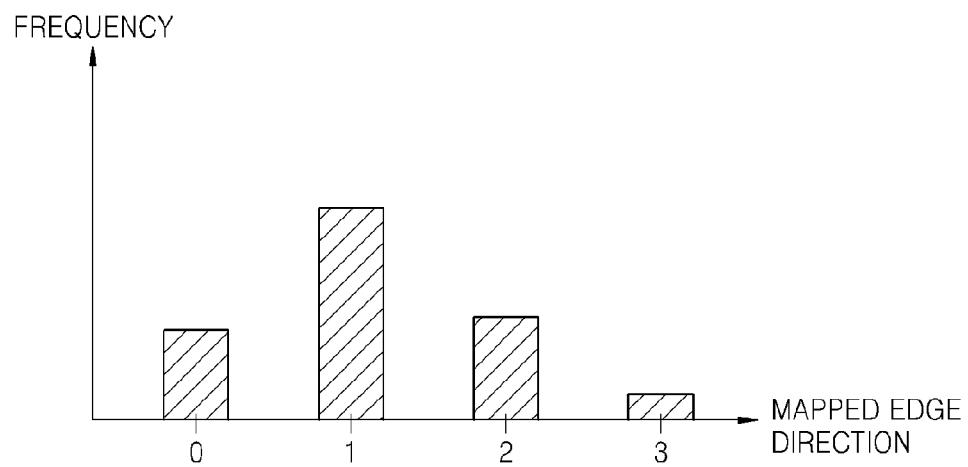
FIG. 19 illustrates an edge direction histogram, according to an exemplary embodiment.

FIG. 19 illustrates an edge direction histogram, according to an exemplary embodiment.

Referring to FIG. 19, the edge detection unit 1610 determines an edge direction histogram by counting a frequency of a mapped edge direction of each pixel included in a coding unit having the first size. As shown in FIG. 19, when a frequency of pixels having an edge direction of the horizontal direction 1 is the highest from among pixels included in the coding unit having the first size, the edge detection unit 1610 determines a leading edge direction of the coding unit having the first size as the horizontal direction 1.

The edge detection unit 1610 repeats this edge detection operation for all coding units having the first size, which are included in a maximum coding unit.

Figure 20:
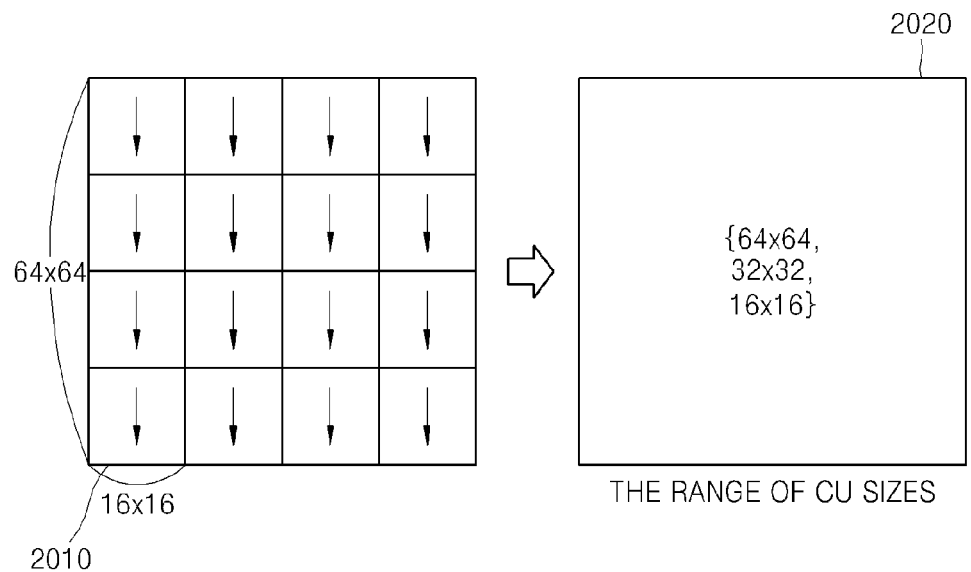
FIG. 20 illustrates determination of an intra prediction mode to be applied to a maximum coding unit based on edge directions of coding units of a first size, according to an exemplary embodiment.

FIG. 20 illustrates determination of an intra prediction mode to be applied to a maximum coding unit based on edge directions of coding units of the first size, according to an exemplary embodiment. In FIG. 20, an arrow displayed in each coding unit having the size of 16×16 indicates a case where all coding units having the size of 4×4, which are included in the coding unit having the size of 16×16, have a same edge direction and directs the same edge direction of the coding units having the size of 4×4.

Referring to FIG. 20, it is assumed that a size of a maximum coding unit 2010 is 64×64, the first size is 4×4, and all coding units having the size of 4×4, which are included in the maximum coding unit 2010, have a same edge direction. As described above, when all of the coding units having the size of 4×4, which are included in the maximum coding unit 2010, have the same edge direction, the maximum coding unit 2010 is set as one intra prediction coding unit group. Intra prediction is performed on the maximum coding unit 2010 by using coding units having the sizes of 64×64, 32×32, and 16×16 as denoted by reference numeral 2020.

Figure 21:
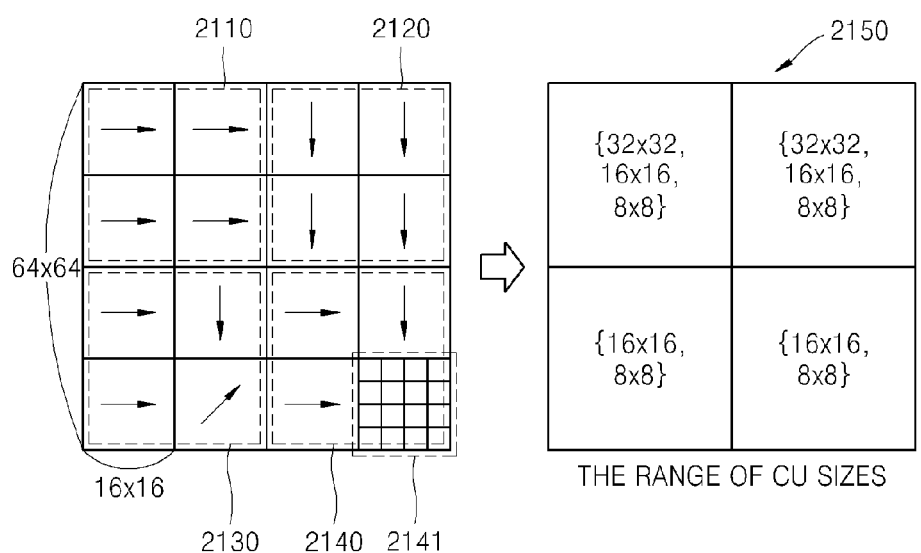
FIG. 21 illustrates determination of an intra prediction mode to be applied to the maximum coding unit based on edge directions of coding units of the first size, according to another exemplary embodiment.

FIG. 21 illustrates determination of an intra prediction mode to be applied to the maximum coding unit based on edge directions of coding units of the first size, according to another exemplary embodiment.

It is assumed that coding units having the size of 4×4 and having different edge directions exist from among coding units having the size of 4×4, which are included in a maximum coding unit having the size of 64×64. In this case, the intra prediction mode candidate determination unit 1620 determines whether edge directions of coding units having the size of 4×4, which are included in each of coding units 2110, 2120, 2130, and 2140 having the size of 32×32 obtained by equally splitting the maximum coding unit by four, are uniform. For the coding units 2110 and 2120 having the size of 32×32, all coding units having the size of 4×4 have a same edge direction. Therefore, each of the coding units 2110 and 2120 having the size of 32×32 is set as one intra prediction coding unit group. As shown with reference to reference numeral 2150, for each of the coding units 2110 and 2120 having the size of 32×32, coding units having the sizes of 32×32, 16×16, and 8×8 are determined as coding units to be applied to intra prediction.

Edge directions of coding units having the size of 4×4, which are included in each of the coding units 2130 and 2140 having the size of 32×32, are not all the same. In this case, the intra prediction mode candidate determination unit 1620 may determine each of the coding units 2130 and 2140 having the size of 32×32 as one intra prediction coding unit group and determine coding units having the sizes of 16×16 and 8×8 as coding units to be applied to intra prediction.

When all coding units having the size of 4×4, which are included in a coding unit 2141 having the size of 16×16, are different, the intra prediction mode candidate determination unit 1620 may determine a coding unit having the size of 4×4 as a coding unit to be applied to intra prediction in addition to the coding units having the sizes of 16×16 and 8×8 only for the coding unit 2141 having the size of 16×16.

The intra prediction mode determination unit 1630 may limit a direction of an intra prediction mode to be applied, based on an edge direction of a coding unit having the first size. For example, as shown in FIG. 20, when a leading edge direction of coding units having the first size, which are included in a maximum coding unit, is the vertical direction, the intra prediction mode determination unit 1630 may apply intra prediction modes having the directivities close to the vertical direction from among the intra prediction modes shown in FIG. 15. Similarly, as shown in FIG. 21, only intra prediction modes having the directivities close to the vertical direction may be used for an intra prediction operation with respect to the coding unit 2120 having the size of 32×32. In addition, only intra prediction modes having the directivities close to the horizontal direction may be used for an intra prediction operation with respect to the coding unit 2110 having the size of 32×32.

Figure 22:
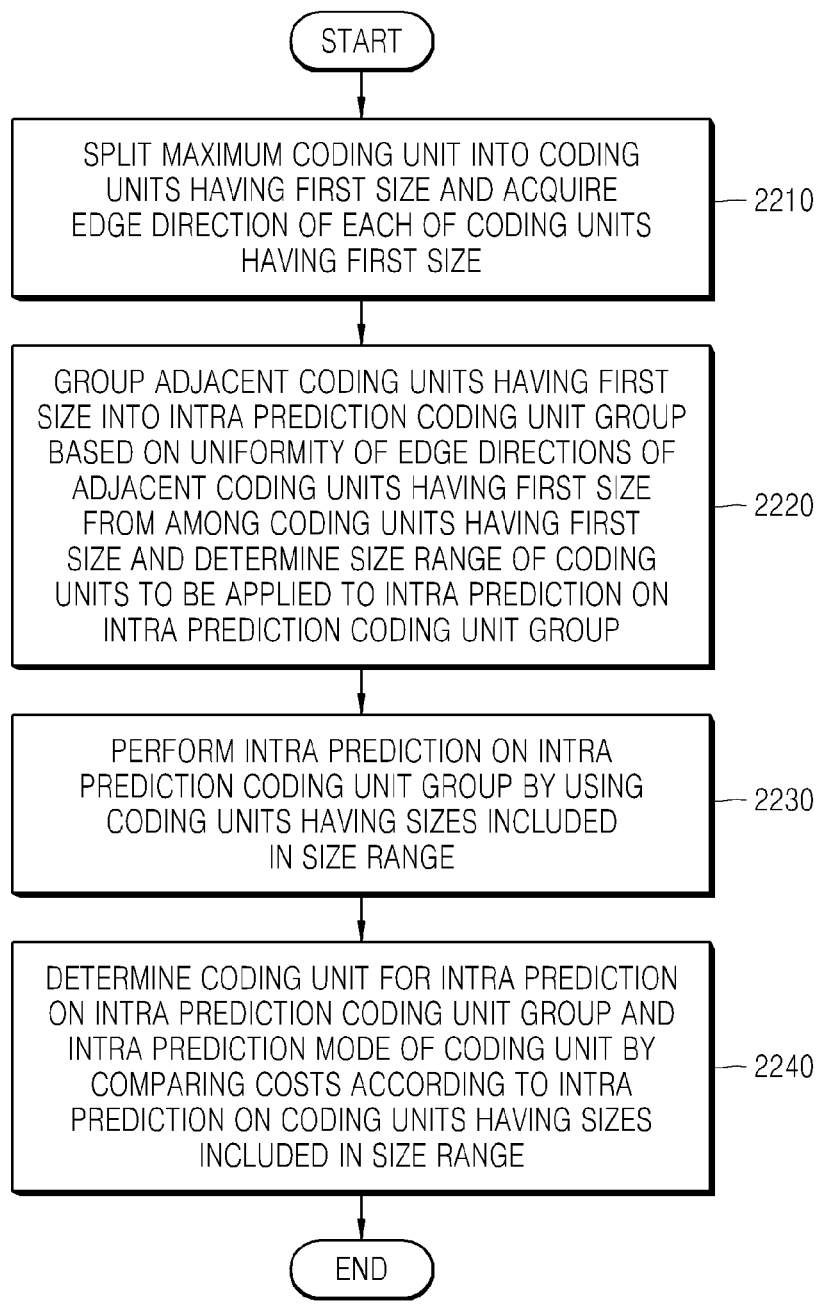
FIG. 22 is a flowchart of a method of determining an intra prediction mode, according to an exemplary embodiment.

FIG. 22 is a flowchart of a method of determining an intra prediction mode, according to an exemplary embodiment.

Referring to FIG. 22, in operation 2210, the edge detection unit 1610 splits a maximum coding unit into coding units having the first size and acquires an edge direction of each of the coding units having the first size. As described above, the edge detection unit 1610 acquires a degree of a horizontal direction difference value and a degree of a vertical direction difference value of each pixel included in a coding unit having the first size by using a predetermined edge detection algorithm and determines a leading edge direction of the coding unit having the first size based on the degree of a horizontal direction difference value and the degree of a vertical direction difference value of each pixel. Thereafter, the edge detection unit 1610 maps an edge direction of each pixel to one of preset predetermined edge directions and determines an edge direction histogram by counting a frequency of the mapped edge direction of each pixel included in the coding unit having the first size. Thereafter, the edge detection unit 1610 determines an edge direction having the highest frequency in the histogram as an edge direction of the coding unit having the first size.

In operation 2220, the intra prediction mode candidate determination unit 1620 groups adjacent coding units having the first size into an intra prediction coding unit group based on the uniformity of edge directions of the adjacent coding units having the first size from among the coding units having the first size and determines a size range of coding units to be applied to intra prediction on the intra prediction coding unit group.

In operation 2230, the intra prediction mode determination unit 1630 performs intra prediction on the intra prediction coding unit group by using coding units having sizes included in the size range of the coding units to be applied to the intra prediction.

In operation 2240, the intra prediction mode determination unit 1630 determines a coding unit for the intra prediction on the intra prediction coding unit group and an intra prediction mode of the coding unit by comparing costs when coding units having different sizes are applied to the intra prediction.

Figure 23:
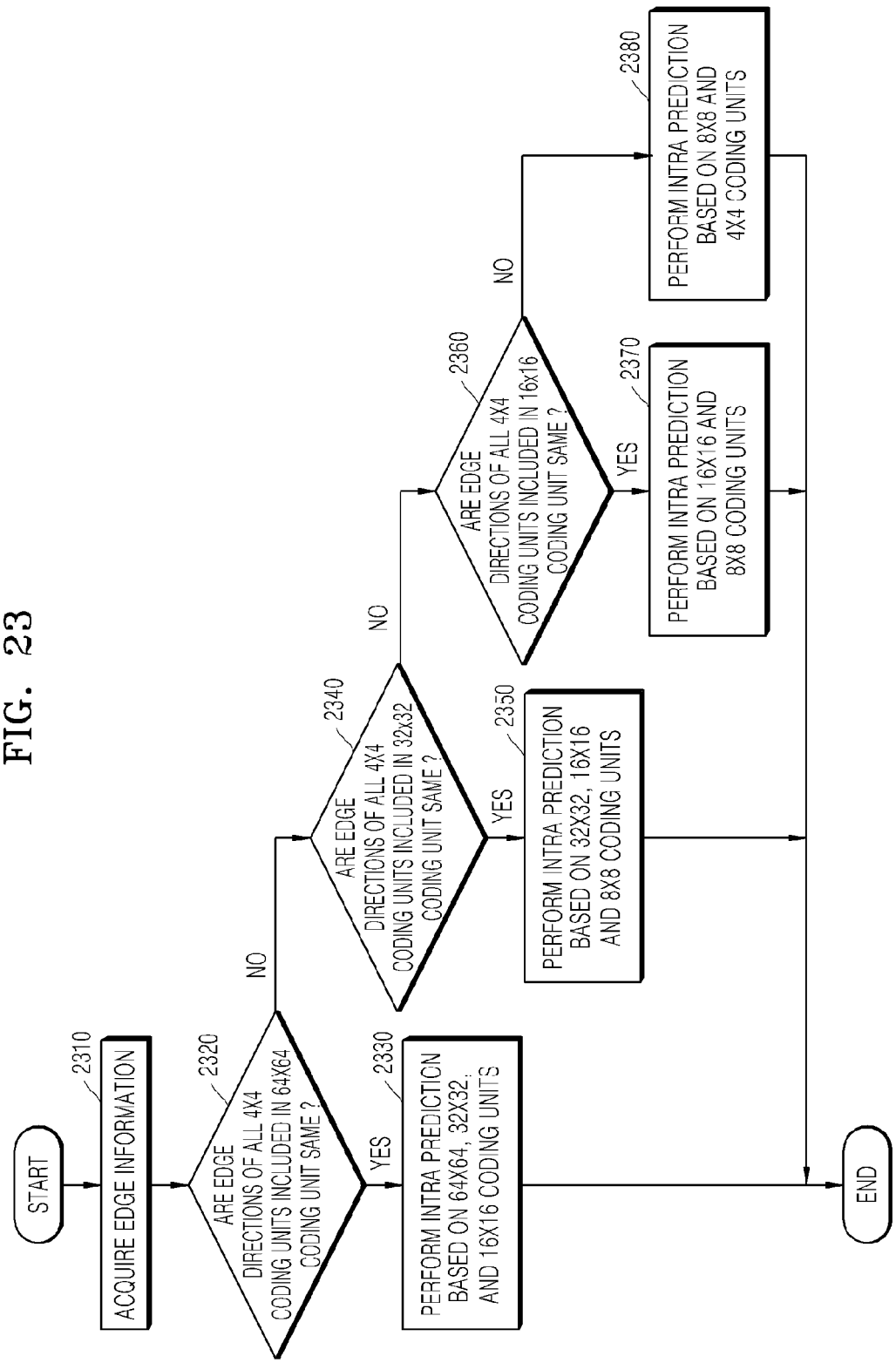
FIG. 23 is a flowchart of an example of the method of determining an intra prediction mode, according to an exemplary embodiment.

FIG. 23 is a flowchart of an example of the method of determining an intra prediction mode, according to an exemplary embodiment. It is assumed that a size of a maximum coding unit is 64×64, and the first size is 4×4.

In operation 2310, the edge detection unit 1610 acquires edge direction information of coding units having the size of 4×4.

In operation 2320, the intra prediction mode candidate determination unit 1620 determines whether all of the coding units having the size of 4×4, which are included in the maximum coding unit having the size of 64×64, have a same edge direction. If all of the coding units having the size of 4×4, which are included in the maximum coding unit having the size of 64×64, have the same edge direction, the intra prediction mode candidate determination unit 1620 determines coding units having the sizes of 64×64, 32×32, and 16×16 as coding units to be applied to intra prediction.

When all of the coding units having the size of 4×4, which are included in the maximum coding unit having the size of 64×64, have the same edge direction, the intra prediction mode determination unit 1630 performs the intra prediction by splitting the maximum coding unit into coding units having the sizes of 64×64, 32×32, and 16×16 and determines a size of a coding unit having an optimal cost and an intra prediction mode direction in operation 2330.

If not all of the coding units having the size of 4×4, which are included in the maximum coding unit having the size of 64×64, have the same edge direction, it is determined in operation 2340 whether all coding units having the size of 4×4, which are included in each of coding units having the size of 32×32 obtained by equally splitting the maximum coding unit having the size of 64×64 by four, have a same edge direction.

If all of the coding units having the size of 4×4, which are included in a coding unit having the size of 32×32, have the same edge direction, the intra prediction mode determination unit 1630 performs the intra prediction by splitting the coding unit having the size of 32×32 into coding units having the sizes of 32×32, 16×16 and 8×8 and determines a size of a coding unit having an optimal cost and an intra prediction mode direction in operation 2350.

If not all of the coding units having the size of 4×4, which are included in the coding unit having the size of 32×32, have the same edge direction, it is determined in operation 2360 whether all coding units having the size of 4×4, which are included in each of coding units having the size of 16×16 obtained by equally splitting the coding unit having the size of 32×32 by four, have a same edge direction.

If all of the coding units having the size of 4×4, which are included in a coding unit having the size of 16×16, have the same edge direction, the intra prediction mode determination unit 1630 performs the intra prediction by splitting the coding unit having the size of 16×16 into coding units having the sizes of 16×16 and 8×8 and determines a size of a coding unit having an optimal cost and an intra prediction mode direction in operation 2370.

If not all of the coding units having the size of 4×4, which are included in the coding unit having the size of 16×16, have the same edge direction, the intra prediction mode determination unit 1630 performs the intra prediction by splitting the coding unit having the size of 16×16 into coding units having the sizes of and 8×8 and 4×4.

As described above, according to one or more of the above exemplary embodiments, an intra prediction mode may be quickly determined by limiting the size of a coding unit on which intra prediction is to be performed, based on an edge component included in a maximum coding unit.

An exemplary embodiment can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and the like. The computer-readable recording medium can also be distributed over network coupled computer systems so that the computer-readable code is stored and executed in a distributed fashion.

In addition, other exemplary embodiments can also be implemented through computer-readable code/instructions in/on a medium, e.g., a computer-readable medium, to control at least one processing element to implement any above described exemplary embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

It should be understood that exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the present inventive concept as defined by the following claims.

What is claimed is:

1. A method of determining an intra prediction mode, the method comprising:

splitting a maximum coding unit into coding units of a first size;

acquiring an edge direction of each of the coding units of the first size;

grouping adjacent coding units of the first size, from among the coding units of the first size, into an intra prediction coding unit group, based on uniformity of edge directions of the adjacent coding units of the first size;

determining a size range of coding units to be applied to intra prediction on the intra prediction coding unit group;

performing the intra prediction on the intra prediction coding unit group by using coding units having sizes included in the determined size range; and determining a coding unit for the intra prediction and an intra prediction mode of the determined coding unit by comparing costs according to the performed intra prediction on the coding units having the sizes included in the size range, wherein the determining the size range of the coding units to be applied to the intra prediction on the intra prediction coding unit group comprises:

when a size of the maximum coding unit is 2N×2N, if all coding units having the first size, which are included in the maximum coding unit, have a same edge direction, determining the maximum coding unit as the intra prediction coding unit group and determining a maximum size of coding units to be applied to the intra prediction on the maximum coding unit as 2N×2N; and when not all of the coding units having the first size, which are included in the maximum coding unit, have a same edge direction, and all coding units having the first size, which are included in a coding unit having a size of $(2N/(2^n))\times(2N/(2^n))$ obtained by equally splitting the maximum coding unit by four n times, have a same edge direction, determining the coding unit having the size of $(2N/(2^n))\times(2N/(2^n))$ as the intra prediction coding unit group and determining a maximum size of coding units to be applied to the intra prediction on the coding unit having the size of $(2N/(2^n))\times(2N/(2^n))$ as $(2N/(2^n))\times(2N/(2^n))$, wherein n and N are integers.

2. The method of claim 1, wherein the acquiring the edge direction comprises:

acquiring, by using a predetermined edge detection algorithm, a degree of a horizontal direction difference value and a degree of a vertical direction difference value of each pixel included in each of the coding units having the first size; and determining, based on the degree of the horizontal direction difference value and the degree of the vertical direction difference value of each pixel, a leading edge direction of each of the coding units having the first size.

3. The method of claim 2, wherein the determining the leading edge direction comprises:

mapping an edge direction of each pixel to an edge direction among a plurality of preset predetermined edge directions based on a $(dy_{i,j}/dx_{i,j})$ value, where $dx_{i,j}$ is the degree of the horizontal direction difference value of each pixel, and $dy_{i,j}$ is the degree of the vertical direction difference value of each pixel;

determining a histogram of the mapped edge direction of each pixel included in each of the coding units having the first size; and determining an edge direction having a highest frequency in the histogram as the edge direction of each of the coding units having the first size.

4. The method of claim 2, wherein the predetermined edge detection algorithm is a Sobel algorithm.

5. The method of claim 1, wherein the intra prediction coding unit group is a region to which coding units in a same size range are applicable in the intra prediction, and has a regular quadrilateral shape of 2m×2m, where m is an integer.

6. An apparatus for determining an intra prediction mode, the apparatus comprising:

an edge detector configured to split a maximum coding unit into coding units of a first size, and to acquire an edge direction of each of the coding units of the first size;

an intra prediction mode candidate determiner configured to determine adjacent coding units of the first size, from among the coding units of the first size, into an intra prediction coding unit group, based on uniformity of edge directions of the adjacent coding units of the first size, and to determine a size range of coding units to be applied to intra prediction on the intra prediction coding unit group; and an intra prediction mode determiner configured to perform the intra prediction on the intra prediction coding unit group by using coding units having sizes included in the determined size range, and to determine a coding unit for the intra prediction and an intra prediction mode of the determined coding unit by comparing costs according to the performed intra prediction on the coding units having the sizes included in the size range, wherein:

when a size of the maximum coding unit is 2N×2N, if all coding units having the first size, which are included in the maximum coding unit, have a same edge direction, the intra prediction mode determiner determines the maximum coding unit as the intra prediction coding unit group and determines a maximum size of coding units to be applied to the intra prediction on the maximum coding unit as 2N×2N;

when not all of the coding units having the first size, which are included in the maximum coding unit, have a same edge direction, and all coding units having the first size, which are included in a coding unit having a size of $(2N/(2^n))\times(2N/(2^n))$ obtained by equally splitting the maximum coding unit by four n times, have a same edge direction, the intra prediction mode determiner determines the coding unit having the size of $(2N/(2^n))\times(2N/(2^n))$ as the intra prediction coding unit group and determines a maximum size of coding units to be applied to the intra prediction on the coding unit having the size of $(2N/(2^n))\times(2N/(2^n))$ as $(2N/(2^n))\times(2N/(2^n))$; and n and N are integers.

7. The apparatus of claim 6, wherein the edge detector acquires, by using a predetermined edge detection algorithm, a degree of a horizontal direction difference value and a degree of a vertical direction difference value of each pixel included in each of the coding units having the first size, and determines, based on the degree of the horizontal direction difference value and the degree of the vertical direction difference value of each pixel, a leading edge direction of each of the coding units having the first size.

8. The apparatus of claim 7, wherein the edge detector:
maps an edge direction of each pixel to an edge direction among a plurality of preset predetermined edge directions based on a $(dy_{i,j}/dx_{i,j})$ value, where $dx_{i,j}$ is the degree of the horizontal direction difference value of each pixel, and $dy_{i,j}$ is the degree of the vertical direction difference value of each pixel;
determines a histogram of the mapped edge direction of each pixel included in each of the coding units having the first size; and
determines an edge direction having a highest frequency in the histogram as an edge direction of each of the coding units having the first size.

9. The apparatus of claim 7, wherein the predetermined edge detection algorithm is a Sobel algorithm.

10. The apparatus of claim 6, wherein the intra prediction coding unit group is a region to which coding units in a same size range are applicable in the intra prediction, and has a regular quadrilateral shape of 2m×2m, where m is an integer.

* * * * *